(12) United States Patent
Zhang et al.

(10) Patent No.: US 11,102,501 B2
(45) Date of Patent: Aug. 24, 2021

(54) MOTION VECTOR FIELD CODING AND DECODING METHOD, CODING APPARATUS, AND DECODING APPARATUS

(71) Applicant: Huawei Technologies Co., Ltd., Shenzhen (CN)

(72) Inventors: Hong Zhang, Shenzhen (CN); Haitao Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 152 days.

(21) Appl. No.: 15/901,410

(22) Filed: Feb. 21, 2018

(65) Prior Publication Data
US 2018/0184108 A1   Jun. 28, 2018

Related U.S. Application Data

(63) Continuation of application No. PCT/CN2015/087947, filed on Aug. 24, 2015.

(51) Int. Cl.
*H04N 19/174* (2014.01)
*H04N 19/31* (2014.01)
(Continued)

(52) U.S. Cl.
CPC .......... *H04N 19/513* (2014.11); *H04N 19/52* (2014.11); *H04N 19/567* (2014.11);
(Continued)

(58) Field of Classification Search
CPC combination set(s) only.
See application file for complete search history.

(56) References Cited

U.S. PATENT DOCUMENTS 6,163,575 A    12/2000 Nieweglowski et al.
6,295,376 B1*  9/2001 Nakaya .................. H04N 19/52
                                                    382/236
(Continued)

FOREIGN PATENT DOCUMENTS

CN    101014129 A    8/2007
CN    101061723 A    10/2007
(Continued)

OTHER PUBLICATIONS

Foreign Communication From a Counterpart Application, Chinese Application No. 201580081772.5, Chinese Office Action dated May 20, 2019, 5 pages.
(Continued)

*Primary Examiner* — Jeffery A Williams
(74) *Attorney, Agent, or Firm* — Conley Rose, P.C.

(57) ABSTRACT

A motion vector field coding and decoding method, where the method includes obtaining an original signal of a current motion vector field block, where the current motion vector field block is obtained by dividing a current motion vector field into blocks, and the current motion vector field is a motion vector field corresponding to a video frame at a moment t, obtaining a prediction signal of the current motion vector field block and prediction information of the current motion vector field block, calculating a prediction residual signal of the current motion vector field block according to the prediction signal and the original signal, where the prediction residual signal is used to indicate a residual between the original signal and the prediction signal, and writing the prediction information and the prediction residual signal into a bitstream.

20 Claims, 9 Drawing Sheets

(51) Int. Cl.
  *H04N 19/513*  (2014.01)
  *H04N 19/52*  (2014.01)
  *H04N 19/573*  (2014.01)
  *H04N 19/567*  (2014.01)
  *H04N 19/577*  (2014.01)
  *H04N 19/537*  (2014.01)
  *H04N 19/40*  (2014.01)
  *H04N 19/53*  (2014.01)

(52) U.S. Cl.
  CPC ......... *H04N 19/573* (2014.11); *H04N 19/174* (2014.11); *H04N 19/31* (2014.11); *H04N 19/40* (2014.11); *H04N 19/53* (2014.11); *H04N 19/537* (2014.11); *H04N 19/577* (2014.11)

(56) References Cited

U.S. PATENT DOCUMENTS

| | | | |
|---|---|---|---|
| 6,711,209 B1* | 3/2004 | Lainema | H04N 19/147 348/699 |
| 2001/0047517 A1 | 11/2001 | Christopoulos et al. | |
| 2004/0258155 A1 | 12/2004 | Lainema et al. | |
| 2005/0063467 A1 | 3/2005 | Hekstra et al. | |
| 2005/0163218 A1 | 7/2005 | Le Clerc et al. | |
| 2005/0207500 A1 | 9/2005 | Bober | |
| 2006/0245495 A1 | 11/2006 | Han et al. | |
| 2007/0217516 A1 | 9/2007 | Zhang | |
| 2008/0025399 A1 | 1/2008 | Le Leannec et al. | |
| 2009/0147851 A1 | 6/2009 | Klein Gunnewiek et al. | |
| 2011/0103480 A1 | 5/2011 | Dane | |
| 2011/0142132 A1* | 6/2011 | Tourapis | H04N 19/597 375/240.16 |
| 2011/0170597 A1 | 7/2011 | Shi et al. | |
| 2011/0228840 A1* | 9/2011 | Yamori | H04N 19/513 375/240.03 |
| 2012/0177124 A1 | 7/2012 | Laroche et al. | |
| 2014/0098189 A1* | 4/2014 | Deng | H04N 19/176 348/43 |
| 2014/0169444 A1 | 6/2014 | Ottaviano et al. | |
| 2014/0269916 A1* | 9/2014 | Lim | H04N 19/13 375/240.15 |
| 2018/0131933 A1* | 5/2018 | Tourapis | H04N 19/56 |

FOREIGN PATENT DOCUMENTS

| | | |
|---|---|---|
| CN | 101185342 A | 5/2008 |
| CN | 101466040 A | 6/2009 |
| EP | 1958451 B1 | 8/2008 |
| EP | 3273693 A1 | 1/2018 |
| JP | H0984017 A | 3/1997 |
| JP | 2003244704 A | 8/2003 |
| JP | 2003532309 A | 10/2003 |
| JP | 2005513929 A | 5/2005 |
| JP | 2005515728 A | 5/2005 |
| JP | 2008521324 A | 6/2008 |
| JP | 2009533887 A | 9/2009 |
| KR | 19990064293 A | 7/1999 |
| WO | 2016188243 A1 | 12/2016 |

OTHER PUBLICATIONS

Machine Translation and Abstract of Japanese Publication No. JPH09084017, Mar. 8, 1997, 13 pages.
Foreign Communication From a Counterpart Application, Australian Application No. 2015406855, Australian Examination Report dated Apr. 4, 2019, 5 pages.
Foreign Communication From a Counterpart Application, Japanese Application No. 2018-508146, Japanese Notice of seasons for Rejections dated Mar. 6, 2019, 3 pages.
Foreign Communication From a Counterpart Application, Japanese Application No. 2018-508146, English Translation of Japanese Notice of Reasons for Rejections dated Mar. 12, 2019, 5 pages.
Machine Translation and Abstract of Chinese Publication No. CN101014129, Aug. 8, 2007, 18 pages.
Machine Translation and Abstract of Chinese Publication No. CN101466040, Jun. 24, 2009, 18 pages.
"Line Transmission of Non-Telephone Signals, Codecs for Videoconferencing Using Primary Digital Group Transmission," ITU-T H.120, Mar. 1993, 66 pages.
"Line Transmission of Non-Telephone Signals Video Codec for Audiovisual Services at p × 64 kbits," ITU-T H.261, Mar. 1993, 29 pages.
"Series H: Audiovisual and Multimedia Systems, Infrastructure of audiovisual services—Coding of moving video, Video coding for low bit rate communication," H.263, Jan. 2005, 226 pages.
"Series H: Audiovisual and Multimedia Systems Infrastructure of audiovisual services—Coding of moving video Advanced video coding for generic audiovisual services," ITU-T H.264, Feb. 2014, 790 pages.
Foreign Communication From a Counterpart Application, PCT Application No. PCT/CN2015/087947, English Translation of International Search Report dated May 27, 2016, 2 pages.
Foreign Communication From a Counterpart Application, PCT Application No. PCT/CN2015/087947, English Translation of Written Opinion dated May 27, 2016, 4 pages.
Maani, E., et al. "Intra mode coding using logical mode numbering," Joint Collaborative Team on Video Coding (JCT-VC) of ITU-T SG16 WP3 and ISO/IEC JTC1/SC29/WG11, 8th Meeting: San Jose, CA, USA, JCTVC-H0407, Feb. 1-10, 2012, 4 pages.
Foreign Communication From a Counterpart Application, Japanese Application No. 2018-508146, Japanese Notice of Reasons for Rejection dated Jul. 23, 2019, 3 pages.
Foreign Communication From a Counterpart Application, Japanese Application No. 2018-508146, English Translation of Japanese Notice of Reasons for Rejection dated Jul. 23, 2019, 6 pages.
Foreign Communication From a Counterpart Application, Korean Application No. 10-2018-7006478, Korean Office Action dated May 28, 2019, 4 pages.
Foreign Communication From a Counterpart Application, Korean Application No. 10-2018-7006478, English Translation of Korean Office Action dated May 28, 2019, 3 pages.
Foreign Communication From a Counterpart Application, International Application No. WO2016188243, dated Dec. 1, 2016, 61 pages.
Foreign Communication From a Counterpart Application, Australian Application No. 2015406855, Australian Examination Report dated Dec. 6, 2018, 3 pages.
Laroche, G., et al., "RD Optimized Coding for Motion Vector Predictor Selection," XP011231739, IEEE Transactions on Circuits and Systems for Video Technology, vol. 18, No. 9, Sep. 2008, pp. 1247-1257.
Liu, H., et al., "Multiple Hypotheses Bayesian Frame Rate Up-Conversion by Adaptive Fusion of Motion-Compensated Interpolations," XP011455234, IEEE Transactions on Circuits and Systems for Video Technology, vol. 22, No. 8, Aug. 2012, pp. 1188-1198.
Foreign Communication of a Counterpart Application, European Application No. 15901942.1, Extended European Search Report dated Apr. 6, 2018, 8 pages.
Foreign Communication From a Counterpart Application, Australian Application No. 2015406855, Australian Office Action dated Aug. 24, 2015, 5 pages.

* cited by examiner

MOTION VECTOR FIELD CODING AND DECODING METHOD, CODING APPARATUS, AND DECODING APPARATUS

CROSS-REFERENCE TO RELATED APPLICATION

This application is a continuation of International Patent Application No. PCT/CN2015/087947 filed on Aug. 24, 2015, which is hereby incorporated by reference in its entirety.

TECHNICAL FIELD

The present disclosure relates to the field of image processing technologies, and in particular, to a motion vector field coding and decoding method, a coding apparatus, and a decoding apparatus.

BACKGROUND

Since the International Telecommunication Union (ITU) launched the first international video coding standard H.120 in 1984, a video coding technology has developed rapidly and vigorously, and has become an indispensable and important part of modern information technologies. Rapid development of the Internet, wireless communications networks, and digital broadcasting networks results in growing requirements of people for obtaining multi-media information. The video coding technology is one of key technologies for effective transmission and storage of video information.

Motion vector field compression is an important part of most video coding solutions. In video coding, a video corresponding to one motion scenario includes a series of video frames, and each video frame includes a still image. The series of video frames cause an illusion of motion by displaying consecutive images relatively quickly, for example, displaying the consecutive images at a rate of 15 frames to 30 frames per second. Due to a relatively high frame rate, images in all of the series of video frames are quite similar. One video frame is selected from the series of video frames as a reference image, and a motion vector field of another video frame in the series of video frames indicates information about displacement of the video frame relative to the reference image. It should be noted that the video frame may be an image adjacent to the reference image, or may not be an image adjacent to the reference image.

One video frame includes multiple pixels. An image in the video frame may be divided into multiple image units. Each image unit includes at least one pixel, and motion vectors of all pixels in each image unit are the same, that is, one image unit has one motion vector. A motion vector field of the video frame includes motion vectors of all the image units.

However, currently, there is no method for effectively compressing a motion vector field.

SUMMARY

Embodiments of the present disclosure provide a motion vector field coding and decoding method, a coding apparatus, and a decoding apparatus in order to improve motion vector field compression efficiency.

A first aspect of the embodiments of the present disclosure provides a video coding method, including obtaining an original signal of a current motion vector field block, where the current motion vector field block is obtained by dividing a current motion vector field into blocks, and the current motion vector field is a motion vector field corresponding to a video frame at a moment t, obtaining a prediction signal of the current motion vector field block and prediction information of the current motion vector field block, where the prediction information is used to indicate information required for obtaining the prediction signal, calculating a prediction residual signal of the current motion vector field block according to the prediction signal and the original signal, where the prediction residual signal is used to indicate a residual between the original signal and the prediction signal, and writing the prediction information and the prediction residual signal into a bitstream.

With reference to the first aspect, in a first possible implementation of the first aspect, obtaining a prediction signal of the current motion vector field block and prediction information of the current motion vector field block includes obtaining a first reference motion vector field of the current motion vector field block, where the first reference motion vector field is a coded and reconstructed motion vector field, the first reference motion vector field is a motion vector field corresponding to a video frame at a moment t1, and the video frame at the moment t1 is a video frame close to the video frame at the moment t, obtaining a second reference motion vector field according to the first reference motion vector field, the moment t, the moment t1, and a moment t2, where the moment t2 is a moment corresponding to a reference video frame used for performing inter-frame prediction on the video frame corresponding to the first reference motion vector field, obtaining the prediction signal according to the second reference motion vector field, where the prediction signal includes a motion vector field block of the second reference motion vector field, and a coordinate range of the motion vector field block of the second reference motion vector field in the second reference motion vector field is the same as a coordinate range of the current motion vector field block in the current motion vector field, and obtaining the prediction information according to the first reference motion vector field, where the prediction information includes information used to indicate the first reference motion vector field.

With reference to the first possible implementation of the first aspect, in a second possible implementation of the first aspect, obtaining a second reference motion vector field according to the first reference motion vector field, the moment t, the moment t1, and a moment t2 includes obtaining a motion vector of a second sampling point of the second reference motion vector field by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

With reference to the first possible implementation of the first aspect, in a third possible implementation of the first aspect, obtaining a second reference motion vector field according to the first reference motion vector field, the moment t, the moment t1, and a moment t2 includes determining a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and (t−t1)/(t1−t2), and setting a product of a weighted average value of the motion vectors of the at least two first sampling points and (t−t1)/(t1−t2) as a motion vector of the second sampling point.

With reference to the first possible implementation of the first aspect, in a fourth possible implementation of the first aspect, obtaining a second reference motion vector field according to the first reference motion vector field, the moment t, the moment t1, and a moment t2 includes obtaining at least one second sampling point close to a target second sampling point of the second reference motion vector field, where a location to which moving is performed from a location of any first sampling point of the first reference motion vector field as a start point according to $\overrightarrow{MV} \times (t-t1)/(t1-t2)$ as displacement is different from a location of the target second sampling point, and $\overrightarrow{MV}$ is a motion vector of the first sampling point, and setting a weighted value of a motion vector of the second sampling point as a motion vector of the target second sampling point when the at least one second sampling point is one second sampling point, or setting a weighted average value of motion vectors of the at least two second sampling points as a motion vector of the target second sampling point when the at least one second sampling point is at least two second sampling points.

With reference to the first aspect, in a fifth possible implementation of the first aspect, obtaining a prediction signal of the current motion vector field block and prediction information of the current motion vector field block includes obtaining a direction coefficient of the current motion vector field block, where the direction coefficient is used to indicate a relationship between a value of a first component of a motion vector of a sampling point of the current motion vector field block and a value of a second component of the motion vector of the sampling point, obtaining a reconstruction value of the first component, calculating the prediction signal according to the reconstruction value of the first component and the direction coefficient, where the prediction signal includes a predictor of the second component, and obtaining the prediction information according to the direction coefficient, where the prediction information includes direction coefficient information used to indicate the direction coefficient.

With reference to the fifth possible implementation of the first aspect, in a sixth possible implementation of the first aspect, obtaining a direction coefficient of the current motion vector field block includes obtaining motion vectors of at least two sampling points of the original signal, setting first components of the motion vectors of the at least two sampling points as independent variables of a preset function, setting second components of the motion vectors of the at least two sampling points as function values corresponding to the independent variables, fitting the independent variables and the function values, and setting a coefficient of the preset function obtained by means of fitting as the direction coefficient.

With reference to the fifth possible implementation of the first aspect, in a seventh possible implementation of the first aspect, obtaining a direction coefficient of the current motion vector field block includes obtaining motion vectors of at least two sampling points of the original signal, setting first components of the motion vectors of the at least two sampling points as independent variables, setting second components of the motion vectors of the at least two sampling points as function values corresponding to the independent variables, and fitting the independent variables and the function values, obtaining a direction coefficient of at least one coded motion vector field block that is in the current motion vector field and that is close to the current motion vector field block, setting a function coefficient obtained by means of fitting and the direction coefficient of the at least one coded motion vector field block as candidate direction coefficients of a candidate direction coefficient set of the current motion vector field block, and obtaining candidate prediction residual signals of the current motion vector field block corresponding to the candidate direction coefficients of the candidate direction coefficient set, and setting a candidate direction coefficient corresponding to a candidate prediction residual signal with smallest signal energy or smallest rate distortion, as the direction coefficient of the current motion vector field block.

With reference to the fifth possible implementation of the first aspect, in an eighth possible implementation of the first aspect, obtaining a direction coefficient of the current motion vector field block includes setting the direction coefficients of the at least two coded motion vector field blocks as the direction coefficient of the current motion vector field block when direction coefficients of at least two coded motion vector field blocks that are in the current motion vector field and that are adjacent to the current motion vector field block are the same.

With reference to the fifth possible implementation of the first aspect, in a ninth possible implementation of the first aspect, obtaining a direction coefficient of the current motion vector field block includes, when direction coefficients of at least two coded motion vector field blocks that are in the current motion vector field and that are adjacent to the current motion vector field block are the same, and the direction coefficients of the at least two coded motion vector field blocks are used to indicate a ratio of a first component of a motion vector of a sampling point of the at least two coded motion vector field blocks to a second component of the motion vector of the sampling point, performing the following steps setting the direction coefficients of the at least two coded motion vector field blocks as a candidate direction coefficient of a candidate direction coefficient set, obtaining a motion vector of at least one sampling point in the original signal, setting a ratio of a first component of the motion vector of the sampling point to a second component of the motion vector of the sampling point as a candidate direction coefficient of the candidate direction coefficient set when the at least one sampling point is one sampling point, or setting an average value of ratios of first components of motion vectors of the at least two sampling points to second components of the motion vectors of the at least two sampling points as a candidate direction coefficient of the candidate direction coefficient set when the at least one sampling point is at least two sampling points, obtaining candidate prediction residual signals of the current motion vector field block corresponding to the candidate direction coefficients of the candidate direction coefficient set, and setting a candidate direction coefficient corresponding to a candidate prediction residual signal with smallest signal energy or smallest rate distortion, as the direction coefficient of the current motion vector field block.

A second aspect of the embodiments of the present disclosure provides a motion vector field decoding method, including obtaining prediction information and a prediction residual signal of a current motion vector field block, where the current motion vector field block is obtained by dividing a current motion vector field into blocks, and the current motion vector field is a motion vector field corresponding to a video frame at a moment t, obtaining a prediction signal of the current motion vector field block according to the prediction information, and calculating a reconstruction signal of the current motion vector field block according to the prediction signal and the prediction residual signal.

With reference to the second aspect, in a first possible implementation of the second aspect, the prediction information includes information used to indicate a first reference motion vector field of the motion vector field block, and obtaining a prediction signal of the current motion vector field block according to the prediction information includes obtaining the first reference motion vector field according to the prediction information, where the first reference motion vector field is a motion vector field of a video frame at a moment t1, obtaining a second reference motion vector field according to the first reference motion vector field, the moment t, the moment t1, and a moment t2, where the moment t2 is a moment corresponding to a reference video frame used for the video frame corresponding to the first reference motion vector field, and obtaining a motion vector field block of the second reference motion vector field, where a coordinate range of the motion vector field block of the second reference motion vector field in the second reference motion vector field is the same as a coordinate range of the current motion vector field block in the current motion vector field, and the prediction signal includes the motion vector field block of the second reference motion vector field.

With reference to the first possible implementation of the second aspect, in a second possible implementation of the second aspect, obtaining a second reference motion vector field according to the first reference motion vector field, the moment t, the moment t1, and a moment t2 includes obtaining a motion vector of a second sampling point of the second reference motion vector field by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

With reference to the first possible implementation of the second aspect, in a third possible implementation of the second aspect, obtaining a second reference motion vector field according to the first reference motion vector field, the moment t, the moment t1, and a moment t2 includes determining a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and $(t-t1)/(t1-t2)$, and setting a product of a weighted average value of the motion vectors of the at least two first sampling points and $(t-t1)/(t1-t2)$ as a motion vector of the second sampling point.

With reference to the first possible implementation of the second aspect, in a fourth possible implementation of the second aspect, obtaining a second reference motion vector field according to the first reference motion vector field, the moment t, the moment t1, and a moment t2 includes obtaining at least one second sampling point close to a target second sampling point of the second reference motion vector field, where a location to which moving is performed from a location of any first sampling point of the first reference motion vector field as a start point according to $\overrightarrow{MV} \times (t-t1)/(t1-t2)$ as displacement is different from a location of the target second sampling point, and $\overrightarrow{MV}$ is a motion vector of the first sampling point, and setting a weighted value of a motion vector of the second sampling point as a motion vector of the target second sampling point when the at least one second sampling point is one second sampling point, or setting a weighted average value of motion vectors of the at least two second sampling points as a motion vector of the target second sampling point when the at least one second sampling point is at least two second sampling points.

With reference to the second aspect, in a fifth possible implementation of the second aspect, the prediction information includes direction coefficient information used to indicate a direction coefficient of the current motion vector field block, and the direction coefficient is used to indicate a relationship between a value of a first component of a motion vector of a sampling point of the current motion vector field block and a value of a second component of the motion vector of the sampling point, and obtaining a prediction signal of the current motion vector field block according to the prediction information includes obtaining a reconstruction value of the first component, and calculating a predictor of the second component according to the direction coefficient and the reconstruction value of the first component, where the prediction signal includes the predictor of the second component.

With reference to the fifth possible implementation of the second aspect, in a sixth possible implementation of the second aspect, the direction coefficient information includes information used to indicate a reconstructed motion vector field block in the current motion vector field, and the direction coefficient includes a direction coefficient of the reconstructed motion vector field block, or the direction coefficient information includes a value of the direction coefficient.

A third aspect of the embodiments of the present disclosure provides a coding apparatus, including a first obtaining module configured to obtain an original signal of a current motion vector field block, where the current motion vector field block is obtained by dividing a current motion vector field into blocks, and the current motion vector field is a motion vector field corresponding to a video frame at a moment t, a second obtaining module configured to obtain a prediction signal of the current motion vector field block and prediction information of the current motion vector field block, where the prediction information is used to indicate information required for obtaining the prediction signal, a calculation module configured to calculate a prediction residual signal of the current motion vector field block according to the prediction signal obtained by the second obtaining module and the original signal obtained by the first obtaining module, where the prediction residual signal is used to indicate a residual between the original signal and the prediction signal, and a coding module configured to write, into a bitstream, the prediction information obtained by the second obtaining module and the prediction residual signal obtained by means of calculation by the calculation module.

With reference to the third aspect, in a first possible implementation of the third aspect, the second obtaining module is configured to obtain a first reference motion vector field of the current motion vector field block, where the first reference motion vector field is a coded and reconstructed motion vector field, the first reference motion vector field is a motion vector field corresponding to a video frame at a moment t1, and the video frame at the moment t1 is a video frame close to the video frame at the moment t, obtain a second reference motion vector field according to the first reference motion vector field, the moment t, the moment t1, and a moment t2, where the moment t2 is a moment corresponding to a reference video frame used for performing inter-frame prediction on the video frame corresponding to the first reference motion vector field, obtain the prediction signal according to the second reference motion vector field, where the prediction signal includes a motion vector field block of the second reference motion vector field, and a coordinate range of the motion vector field block of the second reference motion vector field in the second reference motion vector field is the same as a coordinate range of the current motion vector field block in the current motion vector field, and obtain the prediction information according to the first reference motion vector field, where the prediction information includes information used to indicate the first reference motion vector field.

With reference to the first possible implementation of the third aspect, in a second possible implementation of the third aspect, the second obtaining module is configured to obtain a motion vector of a second sampling point of the second reference motion vector field by means of calculation according to a formula $\vec{MV} \times (t-t1)/(t1-t2)$, where $\vec{MV}$ is a motion vector of a first sampling point of the first reference motion vector field, and a location to which moving is performed from a location of the first sampling point as a start point according to the motion vector of the second sampling point as displacement is the same as a location of the second sampling point.

With reference to the first possible implementation of the third aspect, in a third possible implementation of the third aspect, the second obtaining module is configured to determine a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and $(t-t1)/(t1-t2)$, and set a product of a weighted average value of the motion vectors of the at least two first sampling points and $(t-t1)/(t1-t2)$ as a motion vector of the second sampling point.

With reference to the first possible implementation of the third aspect, in a fourth possible implementation of the third aspect, the second obtaining module is configured to obtain at least one second sampling point close to a target second sampling point of the second reference motion vector field, where a location to which moving is performed from a location of any first sampling point of the first reference motion vector field as a start point according to $\vec{MV} \times (t-t1)/(t1-t2)$ as displacement is different from a location of the target second sampling point, and $\vec{MV}$ is a motion vector of the first sampling point, and set a weighted value of a motion vector of the second sampling point as a motion vector of the target second sampling point when the at least one second sampling point is one second sampling point, or set a weighted average value of motion vectors of the at least two second sampling points as a motion vector of the target second sampling point when the at least one second sampling point is at least two second sampling points.

With reference to the third aspect, in a fifth possible implementation of the third aspect, the second obtaining module is configured to obtain a direction coefficient of the current motion vector field block, where the direction coefficient is used to indicate a relationship between a value of a first component of a motion vector of a sampling point of the current motion vector field block and a value of a second component of the motion vector of the sampling point, obtain a reconstruction value of the first component, calculate the prediction signal according to the reconstruction value of the first component and the direction coefficient, where the prediction signal includes a predictor of the second component, and obtain the prediction information according to the direction coefficient, where the prediction information includes direction coefficient information used to indicate the direction coefficient.

With reference to the fifth possible implementation of the third aspect, in a sixth possible implementation of the third aspect, the second obtaining module is configured to obtain motion vectors of at least two sampling points of the original signal, set first components of the motion vectors of the at least two sampling points as independent variables of a preset function, set second components of the motion vectors of the at least two sampling points as function values corresponding to the independent variables, and fit the independent variables and the function values, and set a coefficient of the preset function obtained by means of fitting as the direction coefficient.

With reference to the fifth possible implementation of the third aspect, in a seventh possible implementation of the third aspect, the second obtaining module is configured to obtain motion vectors of at least two sampling points of the original signal, set first components of the motion vectors of the at least two sampling points as independent variables, set second components of the motion vectors of the at least two sampling points as function values corresponding to the independent variables, fit the independent variables and the function values, obtain a direction coefficient of at least one coded motion vector field block that is in the current motion vector field and that is close to the current motion vector field block, set a function coefficient obtained by means of fitting and the direction coefficient of the at least one coded motion vector field block as candidate direction coefficients of a candidate direction coefficient set of the current motion vector field block, obtain candidate prediction residual signals of the current motion vector field block corresponding to the candidate direction coefficients of the candidate direction coefficient set, and set a candidate direction coefficient corresponding to a candidate prediction residual signal with smallest signal energy or smallest rate distortion, as the direction coefficient of the current motion vector field block.

With reference to the fifth possible implementation of the third aspect, in an eighth possible implementation of the third aspect, the second obtaining module is configured to set the direction coefficients of the at least two coded motion vector field blocks as the direction coefficient of the current motion vector field block when direction coefficients of at least two coded motion vector field blocks that are in the current motion vector field and that are adjacent to the current motion vector field block are the same.

With reference to the fifth possible implementation of the third aspect, in a ninth possible implementation of the third aspect, the second obtaining module is configured to, when direction coefficients of at least two coded motion vector field blocks that are in the current motion vector field and that are adjacent to the current motion vector field block are the same, and the direction coefficients of the at least two coded motion vector field blocks are used to indicate a ratio of a first component of a motion vector of a sampling point of the at least two coded motion vector field blocks to a second component of the motion vector of the sampling point, perform the following steps of setting the direction coefficients of the at least two coded motion vector field blocks as a candidate direction coefficient of a candidate direction coefficient set, obtaining a motion vector of at least one sampling point in the original signal, setting a ratio of a first component of the motion vector of the sampling point to a second component of the motion vector of the sampling point as a candidate direction coefficient of the candidate direction coefficient set when the at least one sampling point is one sampling point, or setting an average value of ratios of first components of motion vectors of the at least two sampling points to second components of the motion vectors of the at least two sampling points as a candidate direction coefficient of the candidate direction coefficient set when the at least one sampling point is at least two sampling points, and obtaining candidate prediction residual signals of the current motion vector field block corresponding to the candidate direction coefficients of the candidate direction coefficient set, and setting a candidate direction coefficient corresponding to a candidate prediction residual signal with smallest signal energy or smallest rate distortion, as the direction coefficient of the current motion vector field block.

A fourth aspect of the embodiments of the present disclosure provides a decoding apparatus, including a first obtaining module configured to obtain prediction information and a prediction residual signal of a current motion vector field block, where the current motion vector field block is obtained by dividing a current motion vector field into blocks, and the current motion vector field is a motion vector field corresponding to a video frame at a moment t, a second obtaining module configured to obtain a prediction signal of the current motion vector field block according to the prediction information, and a calculation module configured to calculate a reconstruction signal of the current motion vector field block according to the prediction signal obtained by the second obtaining module and the prediction residual signal obtained by the first obtaining module.

With reference to the fourth aspect, in a first possible implementation of the fourth aspect, the prediction information includes information used to indicate a first reference motion vector field of the motion vector field block, and the second obtaining module is configured to obtain the first reference motion vector field according to the prediction information, where the first reference motion vector field is a motion vector field of a video frame at a moment t1, obtain a second reference motion vector field according to the first reference motion vector field, the moment t, the moment t1, and a moment t2, where the moment t2 is a moment corresponding to a reference video frame used for the video frame corresponding to the first reference motion vector field, and obtain a motion vector field block of the second reference motion vector field, where a coordinate range of the motion vector field block of the second reference motion vector field in the second reference motion vector field is the same as a coordinate range of the current motion vector field block in the current motion vector field, and the prediction signal includes the motion vector field block of the second reference motion vector field.

With reference to the first possible implementation of the fourth aspect, in a second possible implementation of the fourth aspect, the second obtaining module is configured to obtain a motion vector of a second sampling point of the second reference motion vector field by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

With reference to the first possible implementation of the fourth aspect, in a third possible implementation of the fourth aspect, the second obtaining module is configured to determine a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and $(t-t1)/(t1-t2)$, and set a product of a weighted average value of the motion vectors of the at least two first sampling points and $(t-t1)/(t1-t2)$ as a motion vector of the second sampling point.

With reference to the first possible implementation of the fourth aspect, in a fourth possible implementation of the fourth aspect, the second obtaining module is configured to obtain at least one second sampling point close to a target second sampling point of the second reference motion vector field, where a location to which moving is performed from a location of any first sampling point of the first reference motion vector field as a start point according to $\overrightarrow{MV} \times (t-t1)/(t1-t2)$ as displacement is different from a location of the target second sampling point, and $\overrightarrow{MV}$ is a motion vector of the first sampling point, and set a weighted value of a motion vector of the second sampling point as a motion vector of the target second sampling point when the at least one second sampling point is one second sampling point, or set a weighted average value of motion vectors of the at least two second sampling points as a motion vector of the target second sampling point when the at least one second sampling point is at least two second sampling points.

With reference to the fourth aspect, in a fifth possible implementation of the fourth aspect, the prediction information includes direction coefficient information used to indicate a direction coefficient of the current motion vector field block, and the direction coefficient is used to indicate a relationship between a value of a first component of a motion vector of a sampling point of the current motion vector field block and a value of a second component of the motion vector of the sampling point, and the second obtaining module is configured to obtain a reconstruction value of the first component, and calculate a predictor of the second component according to the direction coefficient and the reconstruction value of the first component, where the prediction signal includes the predictor of the second component.

With reference to the fifth possible implementation of the fourth aspect, in a sixth possible implementation of the fourth aspect, the direction coefficient information includes information used to indicate a reconstructed motion vector field block in the current motion vector field, and the direction coefficient includes a direction coefficient of the reconstructed motion vector field block, or the direction coefficient information includes a value of the direction coefficient.

It can be learned from the foregoing technical solutions that the embodiments of the present disclosure have the following advantage.

In the embodiments of the present disclosure, during coding of the current block, the original signal of the current motion vector field block does not need to be coded, instead, the prediction information and the prediction residual signal are coded. Therefore, motion vector field compression efficiency is improved.

DESCRIPTION OF EMBODIMENTS

To make persons skilled in the art understand the solutions in the present disclosure better, the following clearly describes the technical solutions in the embodiments of the present disclosure with reference to the accompanying drawings in the embodiments of the present disclosure.

The following separately provides detailed descriptions.

Terms "first," "second," "third," "fourth," and the like in the specification, claims, and accompanying drawings of the present disclosure are intended to distinguish between different objects, but do not indicate a specific sequence. In addition, terms "include," "have," and any other variant thereof are intended to cover non-exclusive inclusion. For example, a process, method, system, product, or device that includes a series of steps or units is not limited to the listed steps or units, but optionally further includes a step or unit that is not listed, or optionally further includes another step or unit that is inherent to the process, method, system, product, or device.

The following first describes a motion vector field coding method provided in the embodiments of the present disclosure. The motion vector field coding method provided in the embodiments of the present disclosure is executed by a coding apparatus. The coding apparatus may be any apparatus that needs to output or store a video, for example, a device such as a notebook computer, a tablet computer, a personal computer, a mobile phone, or a video server.

In an embodiment of the motion vector field coding method in the present disclosure, a motion vector field coding method includes obtaining an original signal of a current motion vector field block, where the current motion vector field block is obtained by dividing a current motion vector field into blocks, and the current motion vector field is a motion vector field corresponding to a video frame at a moment t, obtaining a prediction signal of the current motion vector field block and prediction information of the current motion vector field block, where the prediction information is used to indicate information required for obtaining the prediction signal, calculating a prediction residual signal of the current motion vector field block according to the prediction signal and the original signal, where the prediction residual signal is used to indicate a residual between the original signal and the prediction signal, and writing the prediction information and the prediction residual signal into a bitstream.

Figure 1:
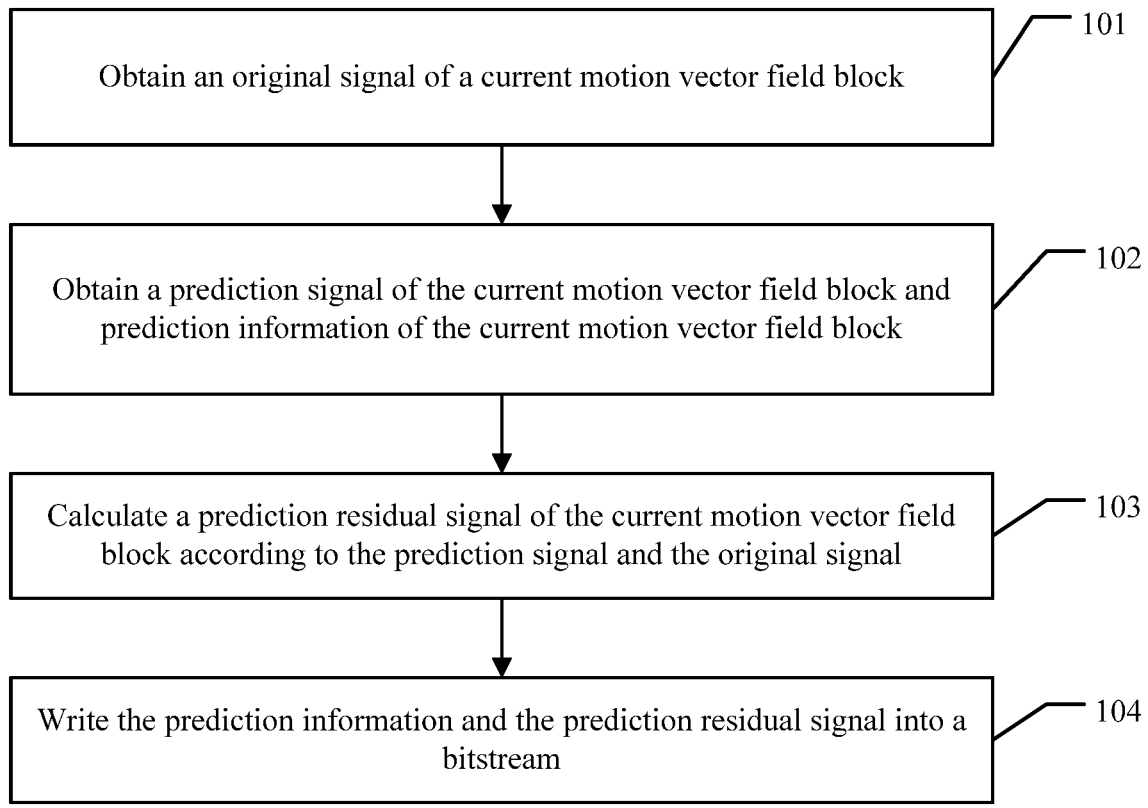
FIG. 1 is a flowchart of an embodiment of a motion vector field coding method according to the present disclosure.

First, referring to FIG. 1, FIG. 1 is a schematic flowchart of a motion vector field coding method provided in an embodiment of the present disclosure. As shown in FIG. 1, the motion vector field coding method provided in this embodiment of the present disclosure may include the following content.

Step 101: Obtain an original signal of a current motion vector field block.

A motion vector field is motion information of an image relative to another image. In video compression, a motion vector field is used to describe motion information of a target video frame relative to a reference video frame of the target video frame. The target video frame includes multiple image blocks, and each image block has a corresponding match block in the reference video frame. There is a one-to-one correspondence between sampling points in the motion vector field and image blocks in the target video frame. A value of each sampling point is a motion vector of an image block corresponding to the sampling point, and the motion vector is information about displacement of the image block relative to a match block of the image block in the reference video frame.

In this embodiment, during compression of a motion vector field corresponding to a video frame at a moment t, the motion vector field is divided into different motion vector field blocks, and compression coding are performed on the motion vector field by performing compression coding on each motion vector field block. One motion vector field block includes at least one sampling point. In the following, for ease of description, a current to-be-compressed motion vector field block is referred to as a current block, and a motion vector field in which the current block is located is referred to as a current field.

It should be noted that, when a motion vector field is divided into different motion vector field blocks, the motion vector field blocks are not necessarily corresponding to image blocks obtained by dividing a video frame corresponding to the motion vector field. For a method for dividing a motion vector field into blocks, refer to a method for dividing a video frame into blocks. This is not limited herein.

Step 102: Obtain a prediction signal of the current motion vector field block and prediction information of the current motion vector field block.

There are multiple methods for obtaining the prediction signal. For example, 35 intra-frame prediction modes of a video frame are provided in a current high efficiency video coding (HEVC) standard. The 35 intra-frame prediction modes include 33 directional prediction modes, an Intra_DC mode, and an Intra_Planar mode. In this embodiment, during obtaining of the prediction signal of the motion vector field block, the intra-frame prediction mode is applied to intra-frame prediction of a current field.

One intra-frame prediction mode is determined, and at least one coded and reconstructed motion vector field block that is in the current field and that is close to the current block is used as a reference motion vector field block of the current block. The prediction signal of the current block is obtained according to the intra-frame prediction mode and the reference motion vector field block.

The motion vector field block close to the current block may be a motion vector field block adjacent to the motion vector field block (that is, adjoining the motion vector field block), or may be a motion vector field block separated from the current block by a preset quantity of motion vector field blocks. This is not limited herein. In actual application, all motion vector field blocks in the current field are coded in a sequence from left to right and from top to bottom. Therefore, generally, an adjacent motion vector field block that is coded and reconstructed and that is on the left of the current block, on the lower left of the current block, above the current block, or on the upper right of the current block is used as the reference motion vector field block.

There are multiple methods for calculating the prediction signal according to a prediction mode and a reference motion vector field block. For example, the obtained intra-frame prediction mode is a horizontal prediction mode in the 33 directional prediction modes. In this case, the reference motion vector field block of the current block is a motion vector field block that is located in a same row as the current block and that is the first motion vector field block on the left of the current block. A reconstruction signal of the reference motion vector field block is used as the prediction signal of the current block.

For another example, the obtained intra-frame prediction mode is the Intra_DC mode. After the reference motion vector field block of the current block is obtained, an average value of reconstruction pixels of the reference motion vector field block is used as the prediction signal of the current block.

Then, correspondingly, the prediction information is an index of the intra-frame prediction mode and an index of the reference motion vector field block.

Alternatively, the prediction information may not include an index of the reference motion vector field block. A coding apparatus and a decoding apparatus pre-determined a location, relative to the current block, of a reference motion vector field block corresponding to each intra-frame prediction mode and that is used for the current block. In this embodiment, the coding apparatus and the decoding apparatus further preset a prediction signal calculation method corresponding to each intra-frame prediction mode. In this way, after receiving the prediction information, the decoding apparatus calculates the prediction signal according to the indexes of the prediction mode and the reference motion vector field block in the prediction information using the preset calculation method.

In actual application, during obtaining of the prediction signal of the current block, one intra-frame prediction mode may be directly determined. The prediction signal of the current block is calculated using the intra-frame prediction mode, and an index of the intra-frame prediction mode is added to the prediction information. Alternatively, all intra-frame prediction modes may be traversed, the prediction signal of the current block is calculated using all the intra-frame prediction modes, and an index of an intra-frame prediction mode corresponding to a prediction signal whose energy has a smallest difference from energy of the original signal of the current block (that is, a prediction residual signal mentioned below) is added to the prediction information. The subsequent prediction residual signal is calculated using the prediction signal.

Step 103: Calculate a prediction residual signal of the current motion vector field block according to the prediction signal and the original signal.

The prediction residual signal is used to indicate a difference between the original signal and the prediction signal. The prediction signal is a prediction signal obtained according to the prediction information. After the prediction signal of the current block is obtained, the difference between the original signal and the prediction signal of the current block is calculated in order to obtain the prediction residual signal of the current block.

A method for calculating the difference between the original signal and the prediction signal of the current block belongs to other approaches, and details are not described herein.

Step 104: Write the prediction information and the prediction residual signal into a bitstream.

The decoding apparatus may obtain the prediction signal of the current block by performing prediction on the current block according to the prediction information, and then can calculate a reconstruction signal of the current field with reference to the prediction residual signal of the current block. Therefore, when performing compression coding on the current block, the coding apparatus only needs to write the prediction information and the prediction residual signal into the bitstream and send the bitstream to the decoding apparatus such that the decoding apparatus can obtain the reconstruction signal of the current field with reference to the prediction residual signal of the current block.

In this embodiment, for coding of the prediction residual signal, refer to coding of a prediction residual signal of a video frame in a video standard. In an application, during coding of the prediction residual signal, the prediction residual signal is first compressed, and then, compressed data is written into the bitstream.

Compression of the prediction residual signal is generally classified into lossy compression and lossless compression. Lossless compression means after compression, a reconstructed motion vector field signal is exactly the same as an original signal and there is no information loss. Lossy compression means after compression, a reconstructed motion vector field signal is not exactly the same as an original signal and there is a specific information loss. A process of lossless compression may include transformation and entropy coding. A process of lossy compression may include transformation, quantization, and entropy coding.

In this embodiment, during coding of the current block, the original signal of the current block does not need to be coded, instead, the prediction information and the prediction residual signal are coded. Therefore, an amount of information that needs to be coded is greatly reduced, and motion vector field coding efficiency is improved. In addition, because the prediction information is information required for obtaining the prediction signal of the current block, the prediction signal that can be obtained by the decoding apparatus according to the prediction information is the same as the prediction signal obtained by the coding apparatus. Therefore, the decoding apparatus can reconstruct, according to the prediction information and the prediction residual signal, a signal that is highly similar to the original signal of the current block.

In this embodiment, there are multiple types of prediction information. Correspondingly, there are multiple methods for obtaining the prediction signal of the current block according to the prediction information. The following describes several of the methods using examples.

In a first example, an intra-field prediction method may be used, that is, prediction is performed on the current block according to the current field. Because there is a specific correlation between the current block and a motion vector field block that is spatially adjacent to the current block, prediction may be performed on the current block according to the intra-field prediction method.

In actual application, there are multiple intra-field prediction methods. For example, the intra-field prediction methods include angle prediction and intra-frame area division prediction. In an angle prediction method, the prediction signal of the current block may be obtained according to the intra-frame prediction mode and the reference motion vector field block of the current block, as described in explanation of step 102.

An intra-frame area division prediction method is as follows. The current block is divided into at least two areas, and in each area, one motion vector is obtained as a prediction signal of the area. Therefore, in the intra-frame area division prediction method, the prediction information includes information about an area division method and information about a method for determining a prediction signal of each area. The information about the area division method is used to indicate the area division method, for example, is an index of the area division method. The information about the method for determining the prediction signal of each area is used to indicate the method for determining the prediction signal of each area, for example, is an index of the method for determining the prediction signal of each area.

Alternatively, the prediction information may not include information about a method for determining a prediction signal of each area, but the coding apparatus and the decoding apparatus store a same preset method for determining the prediction signal of each area. This is not limited herein.

In this embodiment, there are multiple methods for determining the prediction signal of each area. For example, an average value of motion vectors of all sampling points in an area may be used as a prediction signal of the area, a motion vector of one of sampling points in an area may be used as a prediction signal of the area, or another method may be used. This is not limited herein. When a motion vector of one of sampling points in an area is used as a prediction signal of the area, all the sampling points in the area may be traversed once, and a motion vector of a sampling point that causes energy of a prediction residual signal to be the smallest is determined as the prediction signal.

In this embodiment, there are multiple methods for dividing the current block. For example, the current block is first divided into two areas, and then, at least one of the two areas is divided into two areas, and so on. Area division is ended when a preset condition is met.

The preset condition has multiple types of settings. For example, a distortion value of the current block may be calculated after each division, where the distortion value is a maximum value of differences between prediction signals and original signals of all areas in the current block after the division. When the distortion value is less than a preset value, the preset condition is met. Certainly, foregoing is merely description of the preset condition using an example and do not constitute any limitation.

For another example, a preset value may be preset, and a quantity of areas into which the current block is divided is calculated after each division. When the quantity reaches the preset value, the preset condition is met.

When one area is divided into two areas, one or two of the areas may be in a shape of a trapezoid or a triangle. Certainly, a shape of the area may alternatively be another shape. This is not limited herein.

Optionally, in this embodiment, during division of each area, all division methods of the area are traversed, prediction signals of two sub-areas in the area when each division method is used are calculated, and an optimal division method is determined from the division methods according to the prediction signals of the two sub-areas. The optimal division method may be determined using a rate-distortion optimization principle.

In this embodiment, when the current block is divided into different areas, continuous division or discrete division may be performed on the current block. The following separately explains continuous division and discrete division with reference to FIG. 2.

Figure 2:
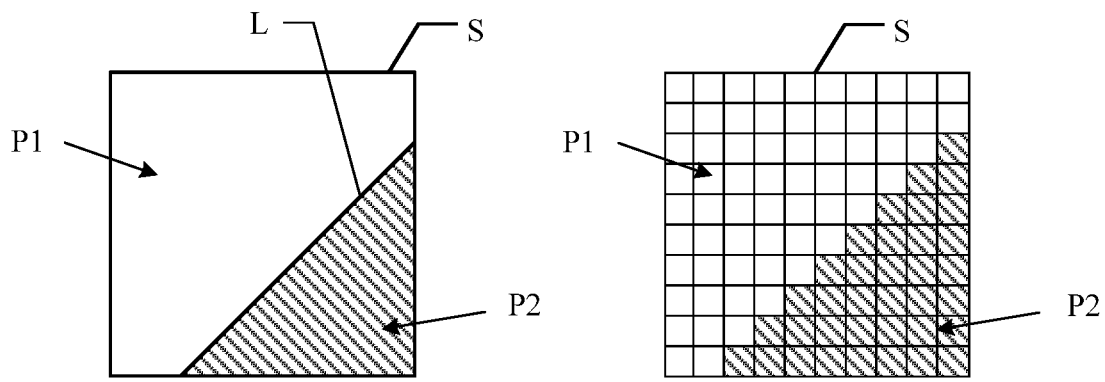
FIG. 2 is a schematic diagram of continuous division and discrete division.

As shown in a left figure in FIG. 2, continuous division means that a current block S is directly divided into two areas, P1 and P2, using a straight line L. Discrete division means that the current block S is constituted by multiple pixel blocks, and during division, the current block is divided along edges of pixel blocks in a current block to divide the current block S into two areas P1 and P2 as shown in a right figure in FIG. 2.

Alternatively, when the current block is divided into different areas, contour division may be performed on the current block. That is, the current block is divided according to a contour of an object represented by an image in the current block. This is not limited herein.

In a second example, an inter-field prediction method may be used. That is, prediction is performed on the current block using a reference motion vector field and according to a correlation between the current field and a motion vector field that is temporally close to the current block. The reference motion vector field is another motion vector field that is temporally close to the current field.

It should be noted that the motion vector field that is close to the current field may be a motion vector field adjacent to the current field (that is, a motion vector field of a video frame that temporally follows or precedes a video frame corresponding to the current field), or may be separated from the current field by at least one motion vector field (that is, may be a motion vector field corresponding to a video frame that is temporally separated, by at least one video frame, from a video frame corresponding to the current field). The following describes two embodiments of the inter-field prediction method using examples.

Embodiment 1: Because there is specific coherence of object motion in time, there is a specific correlation between motion vector fields in time. That is, at least a part of the current block appears in the reference motion vector field. However, a location of the current block in the current field is not necessarily the same as a location of the current block in the reference motion vector field.

For clear description, in this specification, a location of a motion vector field block in a motion vector field is a coordinate range of the motion vector field block in the motion vector field. Therefore, when a location of a motion vector field block p in a motion vector field P is the same as a location of a motion vector field block q in a motion vector field Q, it means that a coordinate range of the motion vector field block p in the motion vector field P is the same as a coordinate range of the motion vector field block q in the motion vector field Q.

Therefore, in this embodiment, obtaining a prediction signal of the current block includes determining the reference motion vector field of the current block, searching for a match block of the current block in the reference motion vector field, and setting a reconstruction signal of the match block as the prediction signal of the current block. There are multiple methods for searching for the match block. For example, all motion vector field blocks in the reference motion vector field may be traversed, differences between the motion vector field blocks and the current block are calculated, and a motion vector field block with a smallest difference from the current block is used as the match block of the current block.

Obtaining prediction information of the current block includes setting information about the reference motion vector field and information about the match block as the prediction information, where the information about the reference motion vector field is used to indicate the reference motion vector field, and the information about the match block is used to indicate the match block. The information about the reference motion vector field may be an index of the reference motion vector field, and the information about the match block may be displacement information of a location of the match block relative to a location of a first motion vector field block in the reference motion vector field. The location of the first motion vector field block in the reference motion vector field is the same as the location of the current block in the current field. Alternatively, the information about the match block may be an index of the match block. This is not limited herein.

Embodiment 2: In this embodiment, it is assumed that a motion status of a same object that is shot in a video sequence remains unchanged, that is, a motion direction and magnitude do not change, within a relatively short time. In this case, the prediction signal of the current block may be deduced according to the reference motion vector field.

Figure 3:
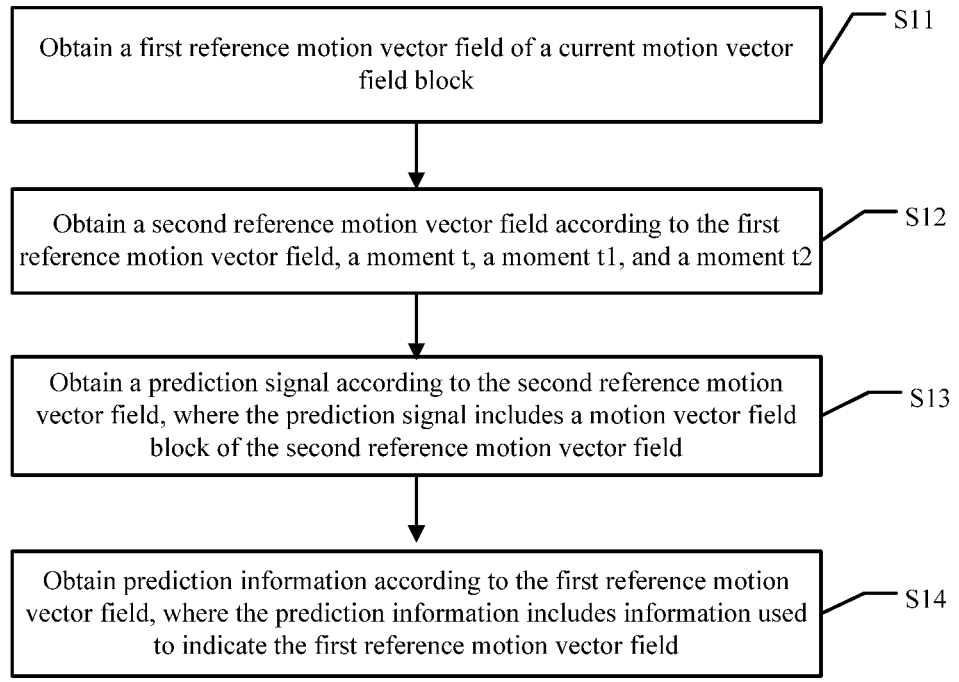
FIG. 3 is a flowchart of an embodiment of obtaining a prediction signal of a current block in the embodiment shown in FIG. 1.

In this embodiment, as shown in FIG. 3, obtaining a prediction signal of the current block includes the following steps.

Step S11: Obtain a first reference motion vector field of the current motion vector field block.

The first reference motion vector field is a coded and reconstructed motion vector field close to the current field. For ease of description, the video frame corresponding to the current field is referred to as a video frame at a moment t, and a video frame corresponding to the first reference motion vector field is referred to as a video frame at a moment t1. The moment t1 may be before the moment t, or may be after the moment t. This is not limited herein.

Step S12: Obtain a second reference motion vector field according to the first reference motion vector field, the moment t, the moment t1, and a moment t2.

For ease of understanding, the following first explains the to-be-described motion vector fields and video frames. A location of a target object in the video frame at the moment t1 is A, a reference video frame used for performing inter-frame prediction on the video frame is a video frame at the moment t2, and a location of the target object in the video frame at the moment t2 is B. In this case, a motion vector $\overrightarrow{MV_0}$ of a first sampling point corresponding to the target object in the first reference motion vector field is used to indicate displacement from the location B to the location A.

It is assumed that a motion status (including a speed and a direction) of the target object remains unchanged, that is, displacement corresponding to the target object within a time from t1 to t2 is $\overrightarrow{MV_0}$. In this case, it can be deduced that displacement of the target object within a time from t to t1 should be $\overrightarrow{MV_0} \times (t-t1)/(t1-t2)$. That is, it is assumed that a location of the target object in the video frame at the moment t is C, and in this case, displacement from the location A to the location C should be $\overrightarrow{MV_0} \times (t-t1)/(t1-t2)$.

According to the foregoing method, each sampling point in the first reference motion vector field is considered as a target object, and a location to which each sampling point is moved at the moment t can be deduced. Each sampling point in the first reference motion vector field is moved. Displacement between a location of each sampling point after the sampling point is moved and a location of the sampling point before the sampling point is moved is $\overrightarrow{MV} \times (t-t1)/(t1-t2)$, a motion vector of the sampling point before the sampling point is moved is $\overrightarrow{MV}$, and the motion vector of the sampling point changes to $\overrightarrow{MV} \times (t-t1)/(t1-t2)$ after the sampling point is moved. For ease of description, a new motion vector field that is formed after all sampling points in the first reference motion vector field are moved according to the foregoing rule and motion vectors of all the sampling points change is referred to as the second reference motion vector field.

Therefore, during obtaining of the second reference motion vector field, a motion vector of a second sampling point of the second reference motion vector field is obtained by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

In this embodiment, when all the sampling points in the first reference motion vector field are moved so as to obtain the second reference motion vector field, at least two sampling points in the first reference motion vector field are moved to a same location in the motion vector field at the moment t.

In this case, current speeds and directions of all the sampling points in the first reference motion vector field remain unchanged, and in the motion vector field formed at the moment t (that is, the second reference motion vector field), at least two sampling points in the first reference motion vector field are possibly moved to a same location.

There are multiple manners of determining a motion vector of a sampling point at the location in the second reference motion vector field. For example, a product of a motion vector of one of the sampling points and (t−t1)/(t1−t2) may be used as the motion vector of the sampling point at the location.

Alternatively, in this case, a motion vector at the location is determined using the following method.

A second sampling point of the second reference motion vector field is determined, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and (t−t1)/(t1−t2).

A product of a weighted average value of the motion vectors of the at least two first sampling points and (t−t1)/(t1−t2) is used as a motion vector of the second sampling point. For ease of description below, the second sampling point is referred to as a target second sampling point, and the at least two first sampling points of the first reference motion vector field are referred to as a first set.

During determining of weights of the motion vectors of all the first sampling points in the first set, the weights of the motion vectors of all the first sampling points in the first set may be preset to be equal, that is, an average value of the motion vectors of all the first sampling points in the first set is used as a motion vector of the target second sampling point.

Figure 4:
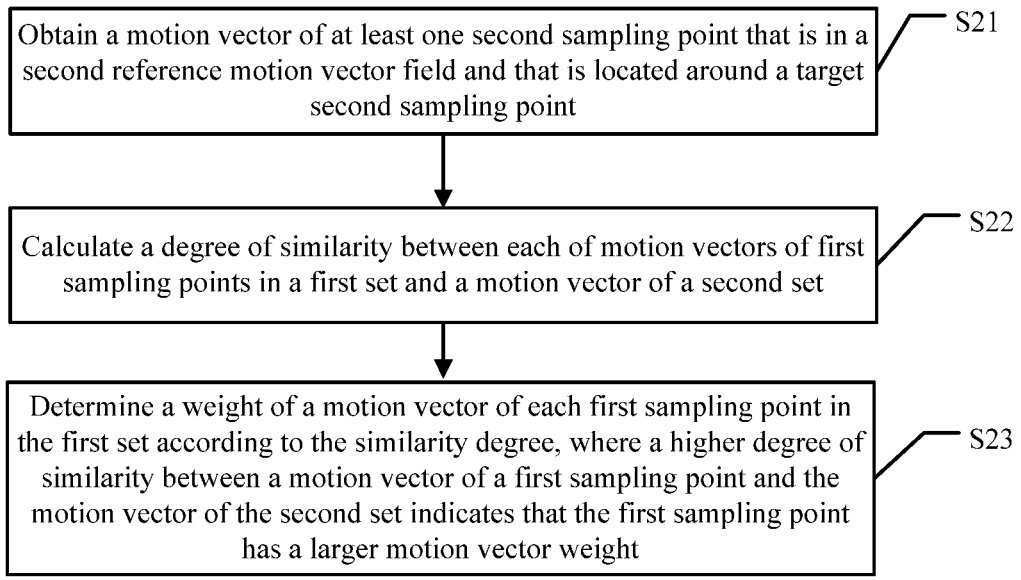
FIG. 4 is a flowchart of an embodiment of determining a weight of a motion vector of each first sampling point in a first set in the embodiment shown in FIG. 3.

Alternatively, as shown in FIG. 4, determining weights of the motion vectors of all the first sampling points in the first set includes the following steps.

Step S21: Obtain a motion vector of at least one second sampling point that is in the second reference motion vector field and that is located around the target second sampling point.

For ease of description, the at least one second sampling point located around the target second sampling point is referred to as a second set, and each second sampling point is an element of the second set.

Optionally, the second set may include at least one of four second sampling points that are located around the target second sampling point and that are adjacent to the target second sampling point.

Step S22: Calculate a degree of similarity between each of the motion vectors of the first sampling points in the first set and a motion vector of the second set.

For each first sampling point in the first set, a degree of similarity between a motion vector of the first sampling point and a motion vector of each sampling point in the second set is calculated. There are multiple methods for similarity degree calculation. For example, differences between the motion vector of the first sampling point and motion vectors of all elements in the second set may be calculated, and then, a sum or an average value of all the differences is used as the degree of similarity between the motion vector of the first sampling point and the motion vector of the second set. In this case, a smaller sum or average value of the differences indicates a higher similarity degree.

Certainly, the foregoing descriptions are merely an example and do not constitute any limitation.

Step S23: Determine a weight of a motion vector of each first sampling point in the first set according to the similarity degree, where a higher degree of similarity between a motion vector of a first sampling point and the motion vector of the second set indicates that the first sampling point has a larger motion vector weight.

After the similarity degree corresponding to the motion vector of each element in the first set is determined, the weight of the motion vector of each element in the first set is determined according to a magnitude of the similarity degree. An element with a higher similarity degree has a larger motion vector weight. Weights corresponding to different rankings may be preset. After a ranking of a similarity degree of each element in the first set is determined, a weight corresponding to the ranking of the element is used as a weight of a motion vector of the element.

The foregoing describes a case in which at least two first sampling points in the first reference motion vector field are moved to a same location in the reference motion vector field at the moment t.

In actual application, there is also possibly a special location in the second reference motion vector field, and no sampling point in the first reference motion vector field is moved to the special location at the moment t.

In this case, at least one second sampling point close to the target second sampling point of the second reference motion vector field is obtained, where a location to which moving is performed from a location of any first sampling point of the first reference motion vector field as a start point according to $\overrightarrow{MV} \times (t-t1)/((t1-t2)$ as displacement is different from a location of the target second sampling point, and $\overrightarrow{MV}$ is a motion vector of the first sampling point.

When the at least one second sampling point is one second sampling point, a weighted value of a motion vector of the second sampling point is used as a motion vector of the target second sampling point.

When the at least one second sampling point is at least two second sampling points, a weighted average value of motion vectors of the at least two second sampling points is used as a motion vector of the target second sampling point.

For ease of description, the at least one second sampling point is referred to as a third set in the following.

During determining of weights of motion vectors of all second sampling points in the third set, the weights of the motion vectors of all the second sampling points in the third set may be preset to be equal, that is, an average value of the motion vectors of all the second sampling points in the third set is used as the motion vector of the target second sampling point.

Alternatively, determining weights of motion vectors of all second sampling points in the third set includes obtaining a distance between each second sampling point in the third set and the target second sampling point, and determining a weight of each second sampling point in the third set according to the distance, where a second sampling point at a shorter distance from the target second sampling point has a larger motion vector weight.

Certainly, when there is only one second sampling point in the third set, a weighted average value of a motion vector of the second sampling point in the third set is the motion vector of the second sampling point.

For example, a distance between a left second sampling point (whose motion vector is $\overrightarrow{MV_1}$) closest to the target second sampling point and the target second sampling point is m, and a distance between a right second sampling point (whose motion vector is $\overrightarrow{MV_2}$) closest to the target second sampling point and the target second sampling point is n. In this case, the motion vector of the target second sampling point is $n/(m+n) \times MV_1 + m/(m+n) \times \overrightarrow{MV_w}$. Certainly, the foregoing descriptions are merely an example and do not constitute any limitation.

Step S13: Obtain the prediction signal according to the second reference motion vector field, where the prediction signal includes a motion vector field block of the second reference motion vector field.

A coordinate range of the motion vector field block of the second reference motion vector field in the second reference motion vector field is the same as a coordinate range of the current motion vector field block in the current motion vector field.

Because the second reference motion vector field is a predictive motion vector field at the moment t, the second reference motion vector field is a prediction signal of the current field. A prediction method used for a different block in the current field is not necessarily the method described in this embodiment. Therefore, when the method described in this embodiment is used for the current block, a signal of a motion vector field block in an area in which the current block is located in the second reference motion vector field is used as the prediction signal of the current block.

Step S14: Obtain the prediction information according to the first reference motion vector field, where the prediction information includes information used to indicate the first reference motion vector field.

During obtaining of the prediction signal of the current block, the prediction signal of the current block can be determined according to only content of the first reference motion vector field. Therefore, the decoding apparatus can calculate the prediction signal of the current block by only using information about the first reference motion vector field as the prediction information. The information about the first reference motion vector field block is used to indicate the first reference motion vector field. For example, the information about the first reference motion vector field is an index of the first reference motion vector field.

In this embodiment, because the prediction information of the current block includes only the information about the first reference motion vector field, a quantity of bits required for coding the current block is greatly reduced.

It should be noted that, although all the methods described above are described using the motion vector as an example, the motion vector may alternatively be replaced by a component of the motion vector in actual application.

In a third example, an inter-motion vector field component prediction method may be used. That is, prediction is performed on a component of a motion vector of each sampling point in the current block according to a direction coefficient of the current block and another component of the motion vector of the sampling point in the current block.

A motion vector includes a direction and a magnitude, and the motion vector may be decomposed into two components a horizontal component and a vertical component. For example, for a motion vector $\overrightarrow{MV}$, an included angle between the motion vector and a horizontal direction is θ. In this case, magnitudes of horizontal and vertical components of the motion vector are $|\overrightarrow{MV_x}|=|\overrightarrow{MV}|*\cos θ$ and $|\overrightarrow{MV_y}|=|\overrightarrow{MV}|*\sin θ$, respectively. Therefore, $$|\overrightarrow{MV_y}| = |\overrightarrow{MV_x}| * \frac{\sin θ}{\cos θ} \text{ and } |\overrightarrow{MV_x}| = |\overrightarrow{MV_y}| * \frac{\cos θ}{\sin θ}$$

can be deduced. In actual application, the coding apparatus generally stores a motion vector of each sampling point by storing a horizontal component and a vertical component of the motion vector of the sampling point. In this embodiment, a prediction signal of a component of a motion vector is calculated using a magnitude of another component of the motion vector and a relationship between the other component and the component.

Figure 5:
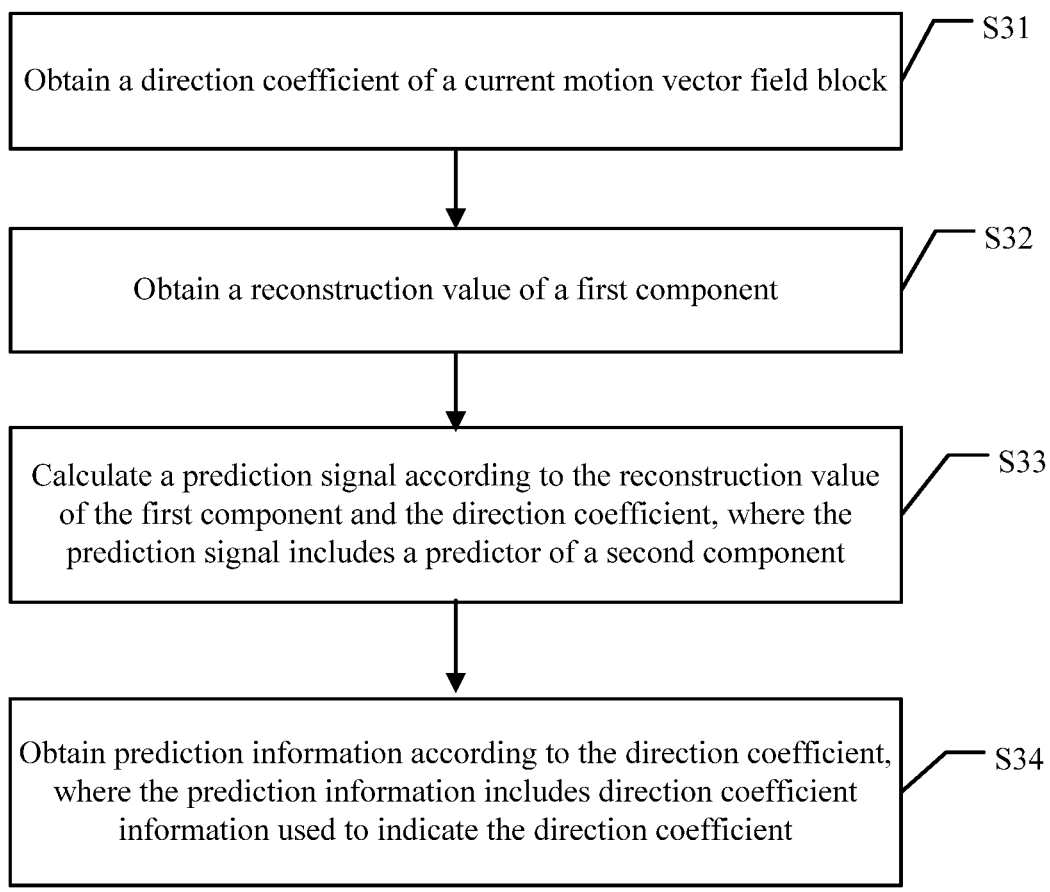
FIG. 5 is a flowchart of an embodiment of obtaining a prediction signal of a current block in the embodiment shown in FIG. 1.

Referring to FIG. 5, the obtaining a prediction signal of the current block includes the following steps.

Step S31: Obtain a direction coefficient of the current motion vector field block.

A motion vector of a sampling point may be decomposed into a vertical component and a horizontal component. For ease of description, one of a vertical component and a horizontal component of a motion vector is referred to as a first component, and the other component is referred to as a second component of the motion vector. Because the current block includes at least one sampling point, the current block may be decomposed into a first component block and a second component block. The first component block includes a first component of each sampling point in the current block, and the second component block includes a second component of each sampling point in the current block.

The direction coefficient of the current block is used to indicate a relationship between a value of the first component and a value of the second component of each sampling point. That is, during prediction of the current block, it is assumed that function relationships between first components and second components of all sampling points in the current block are the same.

Step S32: Obtain a reconstruction value of the first component.

In this embodiment, compression of the current block includes compression of the first component block and the second component block of the current block. During coding of the first component block, the first component block may be coded using the method in the embodiment shown in FIG. 1 or using the intra-field prediction method or the inter-field prediction method described above. This is not limited herein.

During coding of the second component block, because it is assumed that the function relationships between the first components and the second components of all the sampling points are the same, a predictor of each sampling point in the second component block may be calculated using a first component of the sampling point and the direction coefficient.

The decoding apparatus calculates a predictor of a second component of each sampling point in the current block according to the direction coefficient and a reconstruction value of a first component of the sampling point. Therefore, before calculating the prediction signal of the current block, the coding apparatus first obtains the direction coefficient and the reconstruction value of the first component of each sampling point in the current block. It should be noted that, because an information amount of the direction coefficient is relatively small, the coding apparatus generally performs lossless coding on the direction coefficient. Therefore, the coding apparatus does not need to obtain a reconstruction value of the direction coefficient, but directly uses an original value of the direction coefficient.

Step S33: Calculate the prediction signal according to the reconstruction value of the first component and the direction coefficient, where the prediction signal includes a predictor of the second component.

A decoder can obtain the reconstruction value of the first component. Therefore, when the prediction signal of the current block includes the predictor of the second component, the decoder can obtain the prediction signal of the current block according to the predictor of the second component and the reconstruction value of the first component.

For each sampling point in the current block, the direction coefficient of the current block is used as a direction coefficient of the sampling point, that is, a second component of the sampling point is calculated according to a first component of the sampling point and the direction coefficient of the current block. In this way, a prediction signal of each sampling point in the current block includes a predictor of the second component.

Step S34: Obtain the prediction information according to the direction coefficient, where the prediction information includes direction coefficient information used to indicate the direction coefficient.

In this embodiment, because the prediction information of the current block includes one direction coefficient, a quantity of bits required for coding the current block is relatively small.

In the embodiment shown in FIG. 5, there are multiple methods for obtaining the direction coefficient of the current block. The following describes several of the methods using examples.

Figure 6:
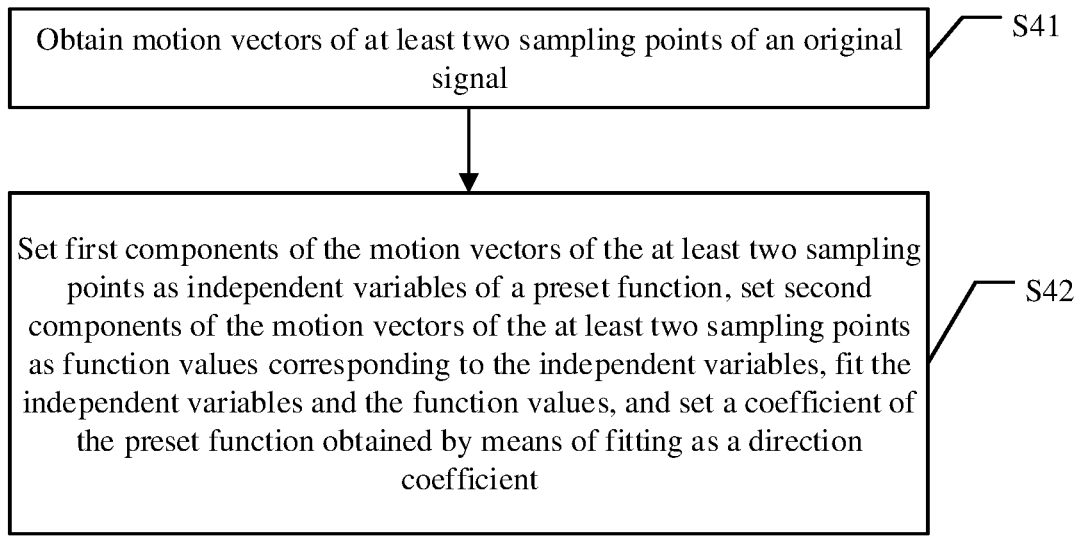
FIG. 6 is a flowchart of an embodiment of obtaining a direction coefficient of a current block in the embodiment shown in FIG. 5.

In a first example, as shown in FIG. 6, obtaining the direction coefficient of the current block includes the following steps.

Step S41: Obtain motion vectors of at least two sampling points of the original signal.

Step S42: Set first components of the motion vectors of the at least two sampling points as independent variables of a preset function, set second components of the motion vectors of the at least two sampling points as function values corresponding to the independent variables, fit the independent variables and the function values, and set a coefficient of the preset function obtained by means of fitting as the direction coefficient.

In this embodiment, the motion vectors of the at least two sampling points in the current block are fitted. During fitting, the first components of the motion vectors of all the sampling points are set as the independent variables of the preset function, and the second components thereof are set as the function values of the preset function to obtain a function relationship between the first components and the second components of all the sampling points in the current block.

All the sampling points may be fitted as one straight line. When all the sampling points are fitted as one straight line, a preset function equation of the straight link is $y=kx$, where k is not equal to 0, or $y=ax+b$, where a is not equal to 0. When the preset function equation is $y=kx$, k is the direction coefficient of the current block. This indicates that all the points in the current block perform rectilinear motion in a same direction. When the preset function equation is $y=ax+b$, a and b are direction coefficients of the current block.

Alternatively, all the points may be fitted as one curve. In this case, a coefficient in a function equation corresponding to the curve is the direction coefficient of the current block. For example, the preset function equation corresponding to the curve is $y=ax^2+bx+c$. In this case, a, b, and c are direction coefficients of the current block.

In this embodiment, as a part of the prediction information, the direction coefficient information of the current motion vector field includes a value of the direction coefficient. Certainly, the coding apparatus and the decoding apparatus need to preset function equations corresponding to different quantities of coefficients. In this way, the coding apparatus only needs to write the direction coefficient into the bitstream such that the decoding apparatus can determine a corresponding function equation according to a quantity of values included in the direction coefficients.

Figure 7:
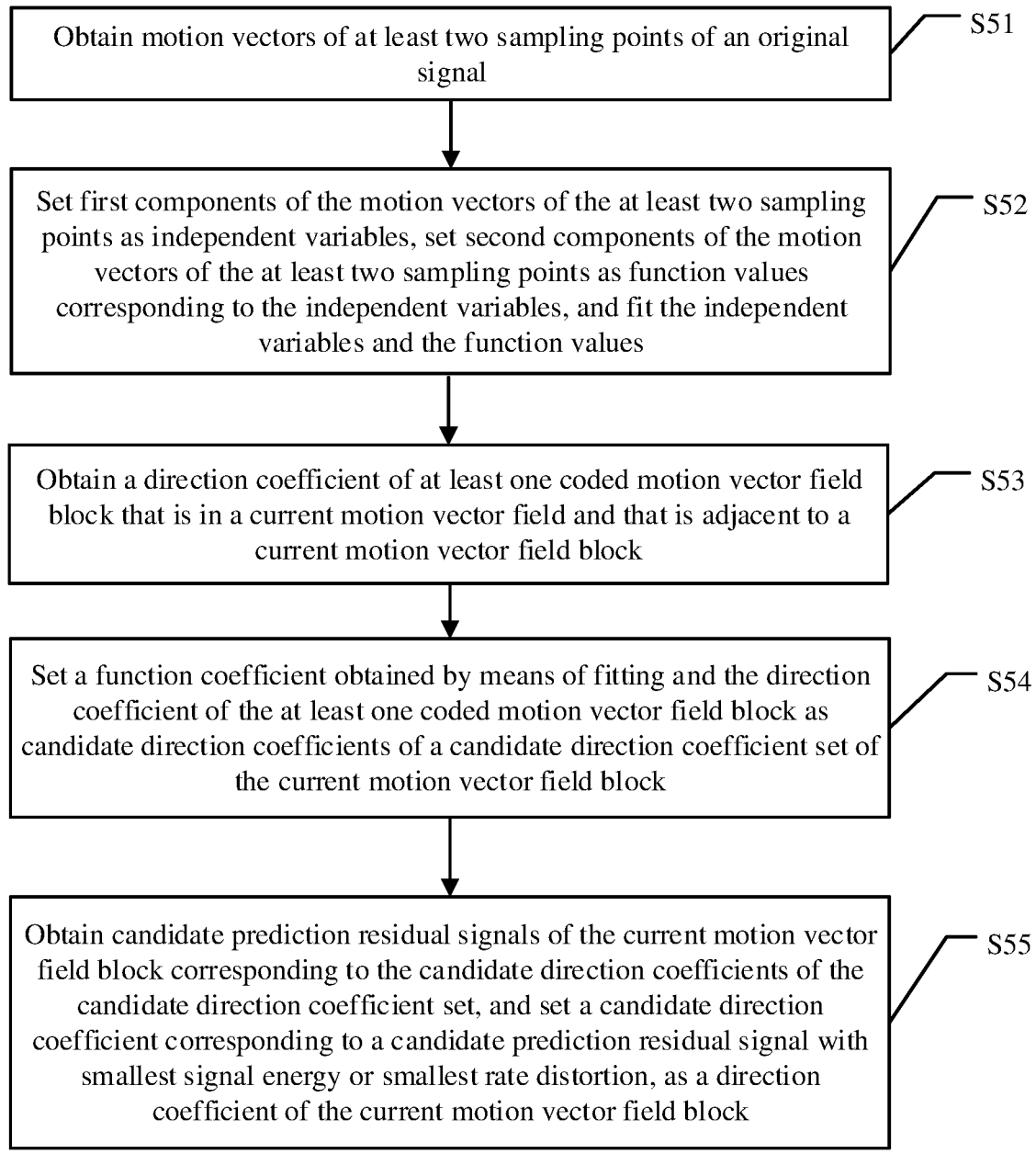
FIG. 7 is a flowchart of another embodiment of obtaining a direction coefficient of a current block in the embodiment shown in FIG. 5.

In a second example, as shown in FIG. 7, obtaining the direction coefficient of the current block includes the following steps.

Step S51: Obtain motion vectors of at least two sampling points of the original signal.

Step S52: Set first components of the motion vectors of the at least two sampling points as independent variables, set second components of the motion vectors of the at least two sampling points as function values corresponding to the independent variables, and fit the independent variables and the function values.

For detailed explanation, refer to a part of the descriptions of step S42 in the first example. Details are not described herein again.

Step S53: Obtain a direction coefficient of at least one coded motion vector field block that is in the current motion vector field and that is close to the current motion vector field block.

Step S54: Set a function coefficient obtained by means of fitting and the direction coefficient of the at least one coded motion vector field block as candidate direction coefficients of a candidate direction coefficient set of the current motion vector field block.

Step S55: Obtain candidate prediction residual signals of the current motion vector field block corresponding to the candidate direction coefficients of the candidate direction coefficient set, and set a candidate direction coefficient corresponding to a candidate prediction residual signal with smallest signal energy or smallest rate distortion, as the direction coefficient of the current motion vector field block.

A difference from the first example lies in that, in this embodiment, after the coefficient of a fitting function of the sampling points in the current block is calculated, the coefficient of the fitting function is not directly used as the direction coefficient of the current block. In all coded blocks that are located around the current block and that are adjacent to the current block, an image corresponding to the current block and an image corresponding to one of all the coded blocks are possibly a same object. In this case, the direction coefficient of the current block is possibly the same as a direction coefficient of one of the coded blocks.

Therefore, in this embodiment, direction coefficients of all the coded blocks are further obtained, and the coefficient of the fitting function and the direction coefficients of all the coded blocks are set as the candidate direction coefficients of the candidate direction coefficient set of the current block. A candidate prediction signal and a candidate prediction residual signal of the current block corresponding to each candidate direction coefficient are calculated. The candidate direction coefficient corresponding to the candidate prediction residual signal with the smallest energy is used as the direction coefficient of the current block.

In this embodiment, when the direction coefficient of the current block is the coefficient of the function, the direction coefficient information includes the value of the direction coefficient. When the direction coefficient of the current block is the direction coefficient of the coded block, the direction coefficient information is used to indicate the coded block or includes a value of the direction coefficient of the coded block. This is not limited herein.

In a third example, when direction coefficients of at least two coded motion vector field blocks that are in the current motion vector field and that are adjacent to the current motion vector field block are the same, obtaining the direction coefficient of the current block includes setting the direction coefficients of the at least two coded motion vector field blocks as the direction coefficient of the current motion vector field block.

When direction coefficients of at least two coded blocks that are adjacent to the current block are the same, it can be deduced that images corresponding to the at least two coded blocks belong to a same object. It is further assumed that an image corresponding to the current block and the images corresponding to the at least two coded blocks belong to a same object. Therefore, it may be directly determined that the direction coefficient of the current block is the same as the direction coefficients of the at least two coded blocks.

In this embodiment, the direction coefficient information of the current motion vector field is used to indicate the coded block or includes the value of the direction coefficient of the coded block. For example, the direction coefficient information includes an index of the coded block. This is not limited herein.

Figure 8:
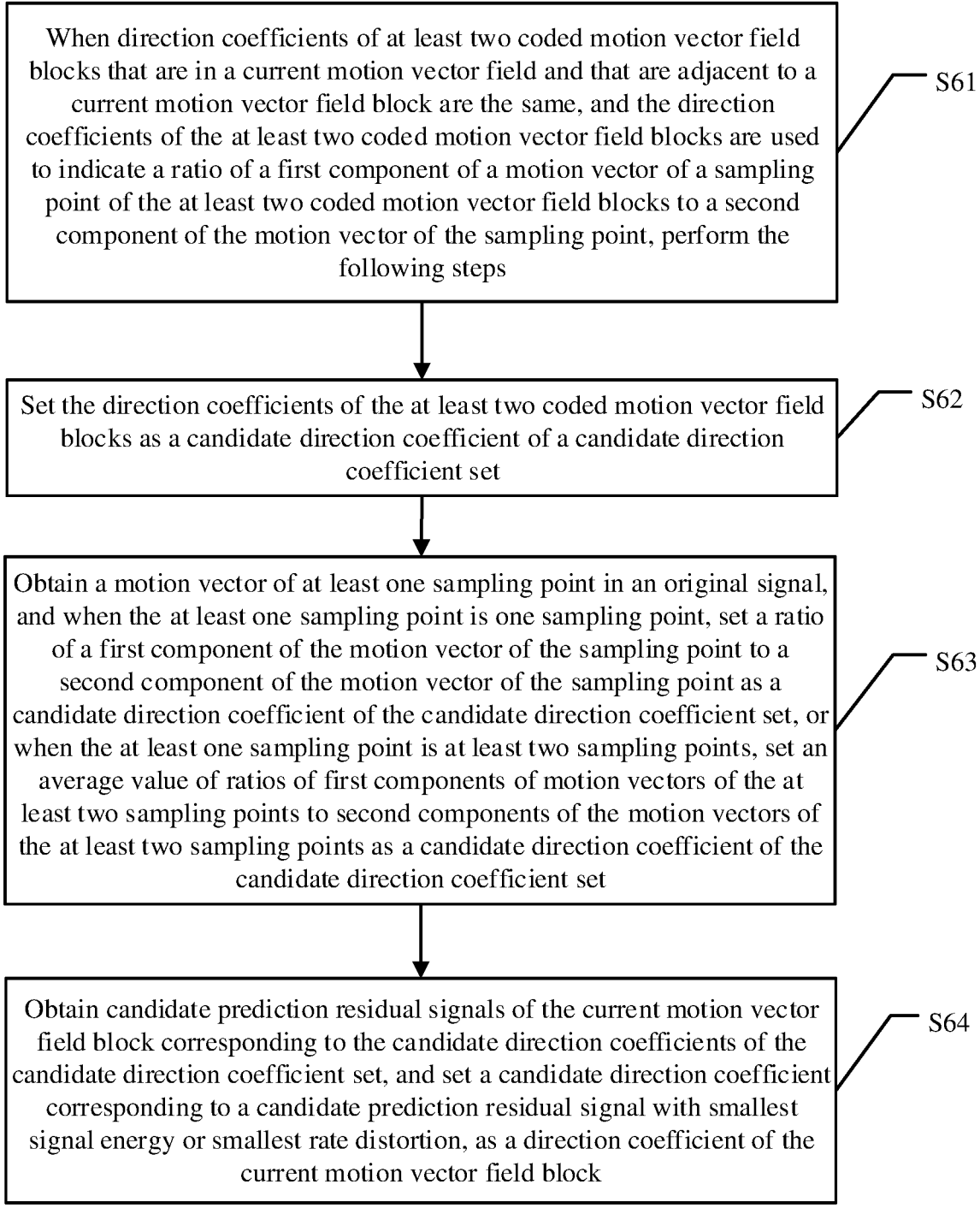
FIG. 8 is a flowchart of another embodiment of obtaining a direction coefficient of a current block in the embodiment shown in FIG. 5.

In a fourth example, as shown in FIG. 8, obtaining the direction coefficient of the current block includes the following steps.

Step S61: When direction coefficients of at least two coded motion vector field blocks that are in the current motion vector field and that are adjacent to the current motion vector field block are the same, and the direction coefficients of the at least two coded motion vector field blocks are used to indicate a ratio of a first component of a motion vector of a sampling point of the at least two coded motion vector field blocks to a second component of the motion vector of the sampling point, perform the following steps.

Step S62: Set the direction coefficients of the at least two coded motion vector field blocks as a candidate direction coefficient of a candidate direction coefficient set.

Step S63: Obtain a motion vector of at least one sampling point in the original signal, and when the at least one sampling point is one sampling point, set a ratio of a first component of the motion vector of the sampling point to a second component of the motion vector of the sampling point as a candidate direction coefficient of the candidate direction coefficient set, or when the at least one sampling point is at least two sampling points, set an average value of ratios of first components of motion vectors of the at least two sampling points to second components of the motion vectors of the at least two sampling points as a candidate direction coefficient of the candidate direction coefficient set.

Step S64: Obtain candidate prediction residual signals of the current motion vector field block corresponding to the candidate direction coefficients of the candidate direction coefficient set, and set a candidate direction coefficient corresponding to a candidate prediction residual signal with smallest signal energy or smallest rate distortion, as the direction coefficient of the current motion vector field block.

A difference from the third example lies in that, in this embodiment, when direction coefficients of at least two coded motion vector field blocks that are in the current motion vector field and that are adjacent to the current motion vector field block are the same, the direction coefficients of the at least two coded motion vector field blocks are not directly used as the direction coefficient of the current block. Images corresponding to all sampling points in the current block are possibly a same object. In this case, the direction coefficient of the current block is possibly the same as a direction coefficient of one of the sampling points.

Therefore, in this embodiment, the motion vector of the at least one sampling point in the original signal is further obtained, and the direction coefficient of the coded block and the average value of the ratio of the first component of the motion vector of the at least one sampling point to the second component of the motion vector of the at least one sampling point are used as the candidate direction coefficients of the candidate direction coefficient set, or the direction coefficient of the coded block and the ratio of the first component of the motion vector to the second component of the motion vector are used as the candidate direction coefficients of the candidate direction coefficient set.

In this embodiment, when the direction coefficient of the current block is the coefficient of the function, the direction coefficient information includes the value of the direction coefficient. When the direction coefficient of the current block is the direction coefficient of the coded block, the direction coefficient information is used to indicate the coded block or includes a value of the direction coefficient of the coded block. This is not limited herein.

The foregoing describes several methods for obtaining the prediction signal and the prediction information of the current block. In actual application, during compression coding of all the motion vector field blocks in the current motion vector field, a same method or different methods may be used for obtaining prediction signals and prediction information of different motion vector field blocks.

When different methods are used for obtaining prediction signals and prediction information of different motion vector field blocks, there are multiple methods for determining a method used for obtaining the prediction signal and the prediction information of the current block. For example, an index corresponding to each obtaining method may be preset on the coding apparatus and the decoding apparatus. When obtaining the prediction signal and the prediction information of the current block, the coding apparatus traverses all obtaining methods, calculates a prediction residual signal when each obtaining method is used, selects, as the obtaining method of the current block, an obtaining method corresponding to a prediction residual signal with smallest energy, and adds an index of the obtaining method to the prediction information of the current block.

The foregoing describes the motion vector field coding method in the embodiments of the present disclosure. The following describes a motion vector field decoding method provided in the embodiments of the present disclosure. The motion vector field decoding method provided in the embodiments of the present disclosure is executed by a decoding apparatus. The decoding apparatus may be any apparatus that needs to output or play a video, for example, a device such as a mobile phone, a notebook computer, a tablet computer, or a personal computer.

In an embodiment of the motion vector field decoding method in the present disclosure, a motion vector field decoding method includes obtaining prediction information and a prediction residual signal of a current motion vector field block, where the current motion vector field block is obtained by dividing a current motion vector field into blocks, and the current motion vector field is a motion vector field corresponding to a video frame at a moment t, obtaining a prediction signal of the current motion vector field block according to the prediction information, and calculating a reconstruction signal of the current motion vector field block according to the prediction signal and the prediction residual signal.

Figure 9:
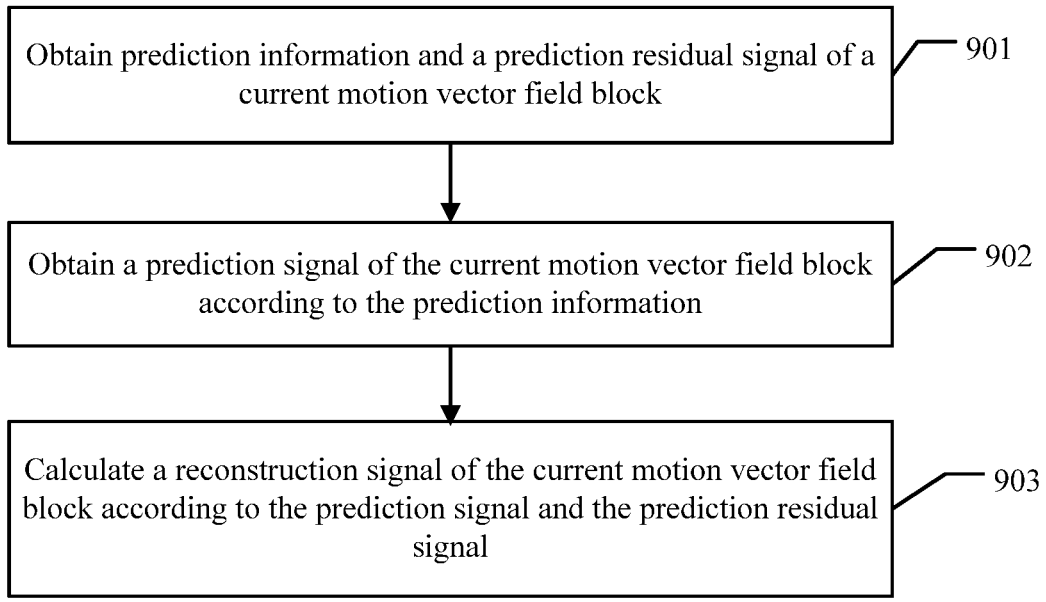
FIG. 9 is a flowchart of an embodiment of a motion vector field decoding method according to the present disclosure.

Referring to FIG. 9, FIG. 9 is a schematic flowchart of a motion vector field decoding method provided in another embodiment of the present disclosure. As shown in FIG. 9, the motion vector field decoding method provided in the other embodiment of the present disclosure may include the following content.

Step 901: Obtain prediction information and a prediction residual signal of a current motion vector field block.

After receiving a video bitstream, a decoding apparatus decodes the video bitstream to restore all video images in an original video sequence. During decoding of each video frame, the video frame is decoded using a reference frame of the video frame and a motion vector field of the video frame.

Therefore, the decoding apparatus needs to first decode the reference frame and the motion vector field of the video frame. In this embodiment, a motion vector field to be decoded currently is referred to as a current motion vector field. The current motion vector field block is obtained by dividing the current motion vector field into blocks, and the current motion vector field is a motion vector field corresponding to a video frame at a moment t.

During decoding of the current motion vector field, a reconstruction signal of the current motion vector field is obtained by sequentially reconstructing all motion vector field blocks in the current motion vector field. During decoding of the current block, the prediction information and the prediction residual signal of the current block is first obtained from the video bitstream.

Step 902: Obtain a prediction signal of the current motion vector field block according to the prediction information.

For prediction information that includes different content, a method for obtaining the prediction signal of the current block according to the prediction information is also different.

For example, when the prediction information is an index of an intra-frame prediction mode and an index of a reference motion vector field block, obtaining a prediction signal of the current motion vector field block according to the prediction information includes determining the intra-frame prediction mode according to the index of the intra-frame prediction mode, determining the reference motion vector field block according to the index of the reference motion vector field block, and then obtaining the prediction signal of the current block according to the intra-frame prediction mode and a signal of the reference motion vector field block.

A coding apparatus and the decoding apparatus preset a prediction signal calculation method corresponding to each intra-frame prediction mode. In this way, after receiving the prediction information, the decoding apparatus calculates the prediction signal according to the indexes of the prediction mode and the reference motion vector field block in the prediction information using a preset calculation method.

For example, the obtained intra-frame prediction mode is a horizontal prediction mode in 35 intra-frame prediction modes of a video frame that are provided in an HEVC standard. In this case, a reconstruction signal of the reference motion vector field block of the current block is used as the prediction signal of the current block.

For another example, the obtained intra-frame prediction mode is an Intra_DC mode in the 35 intra-frame prediction modes. In this case, an average value of reconstruction pixels of the reference motion vector field block is used as the prediction signal of the current block.

In actual application, the prediction information obtained by the decoding apparatus may alternatively not include an index of a reference motion vector field block. The decoding apparatus and the coding apparatus pre-specify a location, relative to the current block, of a reference motion vector field block corresponding to each intra-frame prediction mode and that is used for the current block. In this way, after receiving the prediction information, the decoding apparatus determines a reference motion vector field of the current block according to an intra-frame prediction mode in the prediction information.

Step 903: Calculate a reconstruction signal of the current motion vector field block according to the prediction signal and the prediction residual signal.

The prediction residual signal is used to indicate a difference between an original signal of the current block and the prediction signal. After obtaining the prediction signal of the current block, the decoding apparatus modifies the prediction signal using the prediction residual signal in order to obtain the reconstruction signal of the current block.

In this embodiment, because the prediction information is information required for obtaining the prediction signal of the current block, the prediction signal that can be obtained by the decoding apparatus according to the prediction information is the same as a prediction signal obtained by the coding apparatus. Therefore, the decoding apparatus can reconstruct, according to the prediction information and the prediction residual signal, a signal that is highly similar to the original signal of the current block.

In this embodiment, there are multiple types of prediction information. Correspondingly, there are multiple methods for obtaining the prediction signal of the current block according to the prediction information. The following describes several of the methods using examples.

In a first example, the prediction information includes information about an area division method and information about a method for determining a prediction signal of each area.

The information about the area division method is used to indicate the area division method, for example, is an index of the area division method. The information about the method for determining the prediction signal of each area is used to indicate the method for determining the prediction signal of each area, for example, is an index of the method for determining the prediction signal of each area.

Obtaining a prediction signal of the current motion vector field block according to the prediction information includes determining the area division method according to the information about the area division method, dividing the current block into different areas using the area division method, obtaining, according to the information about the method for determining the prediction signal of each area, the method for determining the prediction signal of each area, and obtaining the prediction signal of each area using the method.

For example, the information about the method for determining the prediction signal of each area indicates that the prediction signal of the area is an average value of motion vectors of all sampling points in the area. In this case, during obtaining of the prediction signal of the area, the average value of the motion vectors of all the sampling points in the area is calculated, and the average value is used as the prediction signal of the area.

Alternatively, the information about the method for determining the prediction signal of each area indicates that the prediction signal of the area is a motion vector of one sampling point in the area. In this case, during obtaining of the prediction signal of the area, the motion vector of the sampling point is obtained according to an index of the sampling point, and the motion vector of the sampling point is used as the prediction signal of the area.

Certainly, the foregoing descriptions are merely examples and do not constitute any limitation herein.

Alternatively, the prediction information may not include information about a method for determining a prediction signal of each area, but the coding apparatus and the decoding apparatus store a same preset method for determining the prediction signal of each area. This is not limited herein.

In this embodiment, there are multiple methods for dividing the current block. For details, refer to example descriptions of the method for dividing the current block in the descriptions of the first example of obtaining the prediction information and the prediction signal in the motion vector field coding method. Details are not described herein again.

In a second example, the prediction information includes information about a reference motion vector field and information about a match block, where the information about the reference motion vector field is used to indicate the reference motion vector field, and the information about the match block is used to indicate the match block.

The information about the reference motion vector field may be an index of the reference motion vector field, and the information about the match block may be displacement information of a location of the match block relative to a location of a first motion vector field block in the reference motion vector field. The location of the first motion vector field block in the reference motion vector field is the same as the location of the current block in the current field. Alternatively, the information about the match block may be an index of the match block. This is not limited herein.

Obtaining a prediction signal of the current motion vector field block according to the prediction information includes determining the reference motion vector field according to the information about the reference motion vector field, searching for the match block in the reference motion vector field according to the information about the match block, and setting a reconstruction signal of the match block as the prediction signal of the current block.

In a third example, the prediction information includes the information used to indicate a first reference motion vector field of the motion vector field block.

Obtaining a prediction signal of the current motion vector field block according to the prediction information includes obtaining the first reference motion vector field according to the prediction information, where the first reference motion vector field is a motion vector field of a video frame at a moment t1, obtaining a second reference motion vector field according to the first reference motion vector field, the moment t, the moment t1, and a moment t2, where the moment t2 is a moment corresponding to a reference video frame used for the video frame corresponding to the first reference motion vector field, and obtaining a motion vector field block of the second reference motion vector field, where a coordinate range of the motion vector field block of the second reference motion vector field in the second reference motion vector field is the same as a coordinate range of the current motion vector field block in the current motion vector field, and the prediction signal includes the motion vector field block of the second reference motion vector field.

In this embodiment, for ease of understanding, the following first explains the to-be-described motion vector fields and video frames. A location of a target object in the video frame at the moment t1 is A, a reference video frame used for performing inter-frame prediction on the video frame is a video frame at the moment t2, and a location of the target object in the video frame at the moment t2 is B. In this case, a motion vector $\overrightarrow{MV_0}$ of a first sampling point corresponding to the target object in the first reference motion vector field is used to indicate displacement from the location B to the location A.

It is assumed that a motion status (including a speed and a direction) of the target object remains unchanged, that is, displacement corresponding to the target object within a time from t1 to t2 is $\overrightarrow{MV_0}$. In this case, it can be deduced that displacement of the target object within a time from t to t1 should be $\overrightarrow{MV_0} \times (t-t1)/(t1-t2)$. That is, it is assumed that a location of the target object in the video frame at the moment t is C, and in this case, displacement from the location A to the location C should be $\overrightarrow{MV_0} \times (t-t1)/(t1-t2)$.

According to the foregoing method, each sampling point in the first reference motion vector field is considered as a target object, and a location to which each sampling point is moved at the moment t can be deduced. Each sampling point in the first reference motion vector field is moved. Displacement between a location of each sampling point after the sampling point is moved and a location of the sampling point before the sampling point is moved is $\overrightarrow{MV} \times (t-t1)/(t1-t2)$, a motion vector of the sampling point before the sampling point is moved is $\overrightarrow{MV}$, and the motion vector of the sampling point changes to $\overrightarrow{MV} \times (t-t1)/(t1-t2)$ after the sampling point is moved. For ease of description, a new motion vector field that is formed after all sampling points in the first reference motion vector field are moved according to the foregoing rule and motion vectors of all the sampling points change is referred to as the second reference motion vector field.

Therefore, optionally, obtaining a second reference motion vector field according to the first reference motion vector field, the moment t, the moment t1, and a moment t2 includes obtaining a motion vector of a second sampling point of the second reference motion vector field by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

In this embodiment, when all the sampling points in the first reference motion vector field are moved so as to obtain the second reference motion vector field, at least two sampling points in the first reference motion vector field are moved to a same location in the motion vector field at the moment t.

In this case, current speeds and directions of all the sampling points in the first reference motion vector field remain unchanged, and in the motion vector field formed at the moment t (that is, the second reference motion vector field), at least two sampling points in the first reference motion vector field are possibly moved to a same location. There are multiple manners of determining a value of a sampling point at the location in the second reference motion vector field. For example, a product of a motion vector of one of the sampling points and (t−t1)/(t1−t2) may be used as a motion vector of the sampling point at the location.

Alternatively, optionally, obtaining a second reference motion vector field according to the first reference motion vector field, the moment t, the moment t1, and a moment t2 includes determining a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and (t−t1)/(t1−t2), and setting a product of a weighted average value of the motion vectors of the at least two first sampling points and (t−t1)/(t1−t2) as a motion vector of the second sampling point.

For ease of description below, the second sampling point is referred to as a target second sampling point, and the at least two first sampling points of the first reference motion vector field are referred to as a first set.

During determining of weights of the motion vectors of all the first sampling points in the first set, the weights of the motion vectors of all the first sampling points in the first set may be set to be equal, that is, an average value of the motion vectors of all the first sampling points in the first set is used as the motion vector of the target second sampling point.

Alternatively, determining weights of the motion vectors of all the first sampling points in the first set includes the following steps.

Step S71: Obtain a motion vector of at least one second sampling point that is in the second reference motion vector field and that is located around the target second sampling point.

For ease of description, the at least one second sampling point located around the target second sampling point is referred to as a second set, and each second sampling point is an element of the second set.

Optionally, the second set may include at least one of four second sampling points that are located around the target second sampling point and that are adjacent to the target second sampling point.

Step S72: Calculate a degree of similarity between each of the motion vectors of the first sampling points in the first set and a motion vector of the second set.

For each first sampling point in the first set, a degree of similarity between a motion vector of the first sampling point and a motion vector of each sampling point in the second set is calculated. There are multiple methods for similarity degree calculation. For example, differences between the motion vector of the first sampling point and motion vectors of all elements in the second set may be calculated, and then, a sum or an average value of all the differences is used as the degree of similarity between the motion vector of the first sampling point and the motion vector of the second set. In this case, a smaller sum or average value of the differences indicates a higher similarity degree.

Certainly, foregoing descriptions are merely an example and do not constitute any limitation.

Step S73: Determine a weight of a motion vector of each first sampling point in the first set according to the similarity degree, where a higher degree of similarity between a motion vector of a first sampling point and the motion vector of the second set indicates that the first sampling point has a larger motion vector weight.

After the similarity degree corresponding to the motion vector of each element in the first set is determined, the weight of the motion vector of each element in the first set is determined according to a magnitude of the similarity degree. An element with a higher similarity degree has a larger motion vector weight. Weights corresponding to different rankings may be preset. After a ranking of a similarity degree of each element in the first set is determined, a weight corresponding to the ranking of the element is used as a weight of a motion vector of the element.

The foregoing describes a case in which at least two first sampling points in the first reference motion vector field are moved to a same location in the reference motion vector field at the moment t.

In actual application, there is also possibly a special location in the second reference motion vector field, and no sampling point in the first reference motion vector field is moved to the special location at the moment t.

Therefore, optionally, obtaining a second reference motion vector field according to the first reference motion vector field, the moment t, the moment t1, and a moment t2 includes obtaining at least one second sampling point close to the target second sampling point of the second reference motion vector field, where a location to which moving is performed from a location of any first sampling point of the first reference motion vector field as a start point according to $\overrightarrow{MV} \times (t-t1)/(t1-t2)$ as displacement is different from a location of the target second sampling point, and $\overrightarrow{MV}$ is a motion vector of the first sampling point, and setting a weighted value of a motion vector of the second sampling point as a motion vector of the target second sampling point when the at least one second sampling point is one second sampling point, or setting a weighted average value of motion vectors of the at least two second sampling points as a motion vector of the target second sampling point when the at least one second sampling point is at least two second sampling points.

For a specific explanation of the solution in the third example, refer to descriptions of the embodiments shown in FIG. 3 and FIG. 4 in the motion vector field coding method. Details are not described herein again.

In a fourth example, the prediction information includes direction coefficient information used to indicate a direction coefficient of the current motion vector field block. The direction coefficient is used to indicate a relationship between a value of a first component of a motion vector of a sampling point of the current motion vector field block and a value of a second component of the motion vector of the sampling point.

Obtaining a prediction signal of the current motion vector field block according to the prediction information includes obtaining a reconstruction value of the first component, and calculating a predictor of the second component according to the direction coefficient and the reconstruction value of the first component, where the prediction signal includes the predictor of the second component.

There are multiple types of direction coefficient information of the current motion vector field block. For example, the direction coefficient information includes information used to indicate a reconstructed motion vector field block in the current motion vector field, and the direction coefficient includes a direction coefficient of the reconstructed motion vector field block. Alternatively, the direction coefficient information includes a value of the direction coefficient.

For a specific explanation of the solution in the fourth example, refer to descriptions of the embodiment shown in FIG. 5 in the motion vector field coding method. Details are not described herein again.

Foregoing describes the motion vector field coding method and the motion vector field decoding method in the present disclosure. The following describes a coding apparatus in the present disclosure.

Figure 10:
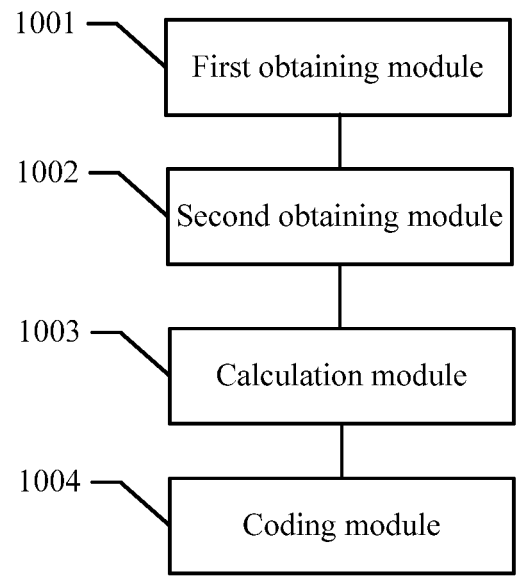
FIG. 10 is a schematic structural diagram of an embodiment of a coding apparatus according to the present disclosure.

Referring to FIG. 10, a coding apparatus provided in an embodiment of the present disclosure includes a first obtaining module 1001 configured to obtain an original signal of a current motion vector field block, where the current motion vector field block is obtained by dividing a current motion vector field into blocks, and the current motion vector field is a motion vector field corresponding to a video frame at a moment t, a second obtaining module 1002 configured to obtain a prediction signal of the current motion vector field block and prediction information of the current motion vector field block, where the prediction information is used to indicate information required for obtaining the prediction signal, a calculation module 1003 configured to calculate a prediction residual signal of the current motion vector field block according to the prediction signal obtained by the second obtaining module 1002 and the original signal obtained by the first obtaining module 1001, where the prediction residual signal is used to indicate a residual between the original signal and the prediction signal, and a coding module 1004 configured to write, into a bitstream, the prediction information obtained by the second obtaining module 1002 and the prediction residual signal obtained by means of calculation by the calculation module 1003.

In this embodiment, when coding the current block, the coding apparatus does not need to code the original signal of the current motion vector field block, but codes the prediction information and the prediction residual signal. Therefore, motion vector field compression efficiency is improved.

In some possible implementations of the present disclosure, the second obtaining module 1002 is configured to determine an intra-frame prediction mode, set at least one coded and reconstructed motion vector field block that is in the current motion vector field and that is close to the current motion vector field block as a reference motion vector field block of the current block, and obtain the prediction signal of the current block according to the intra-frame prediction mode and the reference motion vector field block.

For example, the obtained intra-frame prediction mode is a horizontal prediction mode in 33 directional prediction modes. In this case, the reference motion vector field block of the current block is a motion vector field block that is located in a same row as the current block and that is the first motion vector field block on the left of the current block. In this case, the second obtaining module 1002 is configured to set a reconstruction signal of the reference motion vector field block as the prediction signal of the current block.

For another example, the obtained intra-frame prediction mode is an Intra_DC mode. After obtaining the reference motion vector field block of the current block, the second obtaining module 1002 is configured to set an average value of reconstruction pixels of the reference motion vector field block as the prediction signal of the current block.

In some possible implementations of the present disclosure, the second obtaining module 1002 is configured to obtain a first reference motion vector field of the current motion vector field block, where the first reference motion vector field is a coded and reconstructed motion vector field, the first reference motion vector field is a motion vector field corresponding to a video frame at a moment t1, and the video frame at the moment t1 is a video frame close to the video frame at the moment t, obtain a second reference motion vector field according to the first reference motion vector field, the moment t, the moment t1, and a moment t2, where the moment t2 is a moment corresponding to a reference video frame used for performing inter-frame prediction on the video frame corresponding to the first reference motion vector field, obtain the prediction signal according to the second reference motion vector field, where the prediction signal includes a motion vector field block of the second reference motion vector field, and a coordinate range of the motion vector field block of the second reference motion vector field in the second reference motion vector field is the same as a coordinate range of the current motion vector field block in the current motion vector field, and obtain the prediction information according to the first reference motion vector field, where the prediction information includes information used to indicate the first reference motion vector field.

In some possible implementations of the present disclosure, the second obtaining module 1002 is configured to obtain a motion vector of a second sampling point of the second reference motion vector field by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

In some possible implementations of the present disclosure, the second obtaining module 1002 is configured to determine a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and $(t-t1)/(t1-t2)$, and set a product of a weighted average value of the motion vectors of the at least two first sampling points and $(t-t1)/(t1-t2)$ as a motion vector of the second sampling point.

In some possible implementations of the present disclosure, the second obtaining module 1002 is configured to obtain at least one second sampling point close to a target second sampling point of the second reference motion vector field, where a location to which moving is performed from a location of any first sampling point of the first reference motion vector field as a start point according to $\overrightarrow{MV} \times (t-t1)/(t1-t2)$ as displacement is different from a location of the target second sampling point, and $\overrightarrow{MV}$ is a motion vector of the first sampling point, and set a weighted value of a motion vector of the second sampling point as a motion vector of the target second sampling point when the at least one second sampling point is one second sampling point, or set a weighted average value of motion vectors of the at least two second sampling points as a motion vector of the target second sampling point when the at least one sampling point is at least two second sampling points.

In some possible implementations of the present disclosure, the second obtaining module 1002 is configured to obtain a direction coefficient of the current motion vector field block, where the direction coefficient is used to indicate a relationship between a value of a first component of a motion vector of a sampling point of the current motion vector field block and a value of a second component of the motion vector of the sampling point, obtain a reconstruction value of the first component, calculate the prediction signal according to the reconstruction value of the first component and the direction coefficient, where the prediction signal includes a predictor of the second component, and obtain the prediction information according to the direction coefficient, where the prediction information includes direction coefficient information used to indicate the direction coefficient.

In some possible implementations of the present disclosure, the second obtaining module 1002 is configured to obtain motion vectors of at least two sampling points of the original signal, set first components of the motion vectors of the at least two sampling points as independent variables of a preset function, set second components of the motion vectors of the at least two sampling points as function values corresponding to the independent variables, and fit the independent variables and the function values, and set a coefficient of the preset function obtained by means of fitting as the direction coefficient.

In some possible implementations of the present disclosure, the second obtaining module 1002 is configured to obtain motion vectors of at least two sampling points of the original signal, set first components of the motion vectors of the at least two sampling points as independent variables, set second components of the motion vectors of the at least two sampling points as function values corresponding to the independent variables, and fit the independent variables and the function values, obtain a direction coefficient of at least one coded motion vector field block that is in the current motion vector field and that is close to the current motion vector field block, set a function coefficient obtained by means of fitting and the direction coefficient of the at least one coded motion vector field block as candidate direction coefficients of a candidate direction coefficient set of the current motion vector field block, obtain candidate prediction residual signals of the current motion vector field block corresponding to the candidate direction coefficients of the candidate direction coefficient set, and set a candidate direction coefficient corresponding to a candidate prediction residual signal with smallest signal energy or smallest rate distortion, as the direction coefficient of the current motion vector field block.

In some possible implementations of the present disclosure, when direction coefficients of at least two coded motion vector field blocks that are in the current motion vector field and that are adjacent to the current motion vector field block are the same, the second obtaining module 1002 is configured to set the direction coefficients of the at least two coded motion vector field blocks as the direction coefficient of the current motion vector field block.

In some possible implementations of the present disclosure, when direction coefficients of at least two coded motion vector field blocks that are in the current motion vector field and that are adjacent to the current motion vector field block are the same, and the direction coefficients of the at least two coded motion vector field blocks are used to indicate a ratio of a first component of a motion vector of a sampling point of the at least two coded motion vector field blocks to a second component of the motion vector of the sampling point, the second obtaining module 1002 is configured to perform the following steps of setting the direction coefficients of the at least two coded motion vector field blocks as a candidate direction coefficient of a candidate direction coefficient set, obtaining a motion vector of at least one sampling point in the original signal, and setting a ratio of a first component of the motion vector of the sampling point to a second component of the motion vector of the sampling point as a candidate direction coefficient of the candidate direction coefficient set when the at least one sampling point is one sampling point, or setting an average value of ratios of first components of motion vectors of the at least two sampling points to second components of the motion vectors of the at least two sampling points as a candidate direction coefficient of the candidate direction coefficient set when the at least one sampling point is at least two sampling points, obtaining candidate prediction residual signals of the current motion vector field block corresponding to the candidate direction coefficients of the candidate direction coefficient set, and setting a candidate direction coefficient corresponding to a candidate prediction residual signal with smallest signal energy or smallest rate distortion, as the direction coefficient of the current motion vector field block.

The foregoing describes the motion vector field coding method, the motion vector field decoding method, and the coding apparatus in the present disclosure. The following describes a decoding apparatus in the present disclosure.

Figure 11:
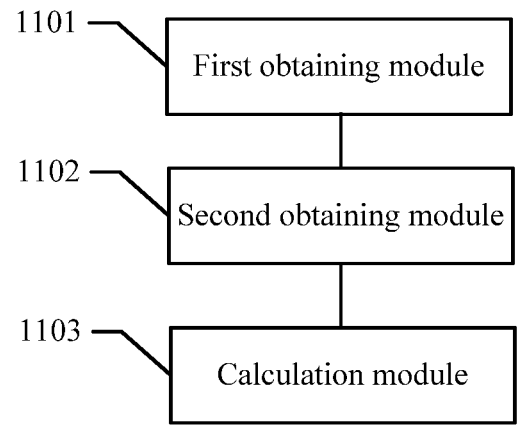
FIG. 11 is a schematic structural diagram of an embodiment of a decoding apparatus according to the present disclosure.

Referring to FIG. 11, a decoding apparatus provided in an embodiment of the present disclosure includes a first obtaining module 1101 configured to obtain prediction information and a prediction residual signal of a current motion vector field block, where the current motion vector field block is obtained by dividing a current motion vector field into blocks, and the current motion vector field is a motion vector field corresponding to a video frame at a moment t, a second obtaining module 1102 configured to obtain a prediction signal of the current motion vector field block according to the prediction information, and a calculation module 1103 configured to calculate a reconstruction signal of the current motion vector field block according to the prediction signal obtained by the second obtaining module 1102 and the prediction residual signal obtained by the first obtaining module 1101.

In some possible implementations of the present disclosure, the prediction information includes information used to indicate a first reference motion vector field of the motion vector field block, and the second obtaining module 1102 is configured to obtain the first reference motion vector field according to the prediction information, where the first reference motion vector field is a motion vector field of a video frame at a moment t1, obtain a second reference motion vector field according to the first reference motion vector field, the moment t, the moment t1, and a moment t2, where the moment t2 is a moment corresponding to a reference video frame used for the video frame corresponding to the first reference motion vector field, and obtain a motion vector field block of the second reference motion vector field, where a coordinate range of the motion vector field block of the second reference motion vector field in the second reference motion vector field is the same as a coordinate range of the current motion vector field block in the current motion vector field, and the prediction signal includes the motion vector field block of the second reference motion vector field.

In some possible implementations of the present disclosure, the second obtaining module 1102 is configured to obtain a motion vector of a second sampling point of the second reference motion vector field by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

In some possible implementations of the present disclosure, the second obtaining module 1102 is configured to determine a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and $(t-t1)/(t1-t2)$, and set a product of a weighted average value of the motion vectors of the at least two first sampling points and $(t-t1)/(t1-t2)$ as a motion vector of the second sampling point.

In some possible implementations of the present disclosure, the second obtaining module 1102 is configured to obtain at least one second sampling point close to a target second sampling point of the second reference motion vector field, where a location to which moving is performed from a location of any first sampling point of the first reference motion vector field as a start point according to $\overrightarrow{MV} \times (t-t1)/(t1-t2)$ as displacement is different from a location of the target second sampling point, and $\overrightarrow{MV}$ is a motion vector of the first sampling point, and set a weighted value of a motion vector of the second sampling point as a motion vector of the target second sampling point when the at least one second sampling point is one second sampling point, or set a weighted average value of motion vectors of the at least two second sampling points as a motion vector of the target second sampling point when the at least one second sampling point is at least two second sampling points.

In some possible implementations of the present disclosure, the prediction information includes direction coefficient information used to indicate a direction coefficient of the current motion vector field block, and the direction coefficient is used to indicate a relationship between a value of a first component of a motion vector of a sampling point of the current motion vector field block and a value of a second component of the motion vector of the sampling point.

The second obtaining module 1102 is configured to obtain a reconstruction value of the first component, and calculate a predictor of the second component according to the direction coefficient and the reconstruction value of the first component, where the prediction signal includes the predictor of the second component.

In some possible implementations of the present disclosure, the direction coefficient information includes information used to indicate a reconstructed motion vector field block in the current motion vector field, and the direction coefficient includes a direction coefficient of the reconstructed motion vector field block. Alternatively, the direction coefficient information includes a value of the direction coefficient.

Figure 12:
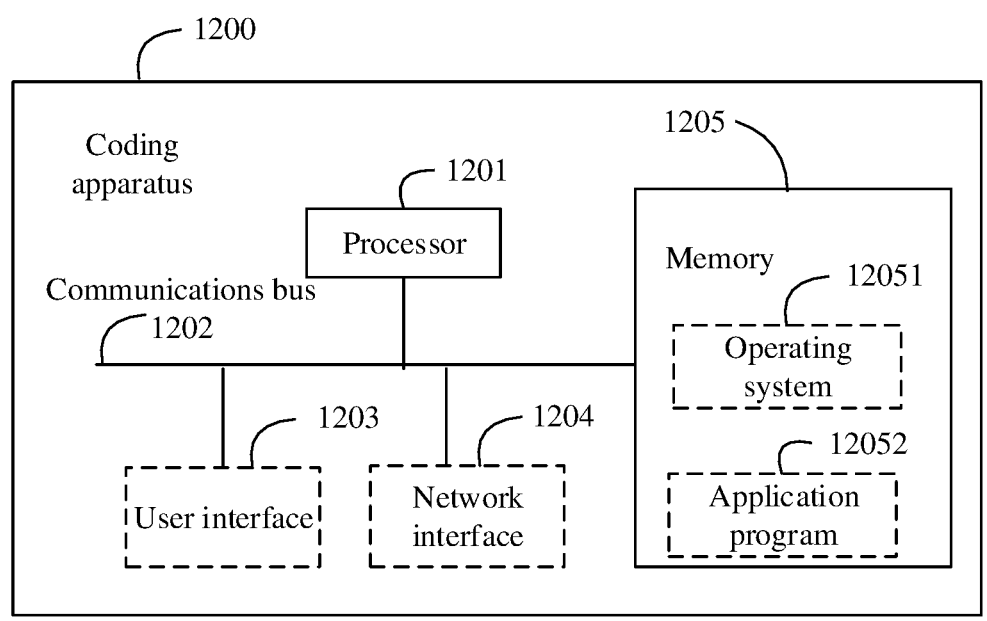
FIG. 12 is a structural block diagram of another embodiment of a coding apparatus according to the present disclosure.

Referring to FIG. 12, FIG. 12 is a structural block diagram of a coding apparatus 1200 provided in another embodiment of the present disclosure. The coding apparatus 1200 may include at least one processor 1201, a memory 1205, and at least one communications bus 1202. Optionally, the coding apparatus 1200 may further include at least one network interface 1204 and/or a user interface 1203. The user interface 1203 includes, for example, a display (for example, a touchscreen, a liquid crystal display (LCD), holographic imaging device, a cathode ray tube (CRT), or a projector), a click device (for example, a mouse, a trackball, a touch panel, or a touchscreen), a camera, and/or a sound pickup apparatus.

The memory 1205 may include a read-only memory (ROM) and a random access memory (RAM), and provides an instruction and data for the processor 1201. A part of the memory 1205 may further include a nonvolatile RAM (NVRAM).

In some implementations, the memory 1205 stores the following elements, that is, an executable module or a data structure, a subset thereof, or an extension set thereof, an operating system 12051, including various system programs and configured to implement various basic services and process a hardware-based task, and an application program 12052, including various application programs and configured to implement various application services.

In this embodiment of the present disclosure, by invoking the program or instruction stored in the memory 1205, the processor 1201 is configured to obtain an original signal of a current motion vector field block, where the current motion vector field block is obtained by dividing a current motion vector field into blocks, and the current motion vector field is a motion vector field corresponding to a video frame at a moment t, obtain a prediction signal of the current motion vector field block and prediction information of the current motion vector field block, where the prediction information is used to indicate information required for obtaining the prediction signal, calculate a prediction residual signal of the current motion vector field block according to the prediction signal and the original signal, where the prediction residual signal is used to indicate a residual between the original signal and the prediction signal, and write the prediction information and the prediction residual signal into a bitstream.

In this embodiment of the present disclosure, during coding of the current block, the original signal of the current motion vector field block does not need to be coded, instead, the prediction information and the prediction residual signal are coded. Therefore, motion vector field compression efficiency is improved.

Optionally, obtaining a prediction signal of the current motion vector field block and prediction information of the current motion vector field block includes obtaining a first reference motion vector field of the current motion vector field block, where the first reference motion vector field is a coded and reconstructed motion vector field, the first reference motion vector field is a motion vector field corresponding to a video frame at a moment t1, and the video frame at the moment t1 is a video frame close to the video frame at the moment t, obtaining a second reference motion vector field according to the first reference motion vector field, the moment t, the moment t1, and a moment t2, where the moment t2 is a moment corresponding to a reference video frame used for performing inter-frame prediction on the video frame corresponding to the first reference motion vector field, obtaining the prediction signal according to the second reference motion vector field, where the prediction signal includes a motion vector field block of the second reference motion vector field, and a coordinate range of the motion vector field block of the second reference motion vector field in the second reference motion vector field is the same as a coordinate range of the current motion vector field block in the current motion vector field, and obtaining the prediction information according to the first reference motion vector field, where the prediction information includes information used to indicate the first reference motion vector field.

Optionally, obtaining a second reference motion vector field according to the first reference motion vector field, the moment t, the moment t1, and a moment t2 includes obtaining a motion vector of a second sampling point of the second reference motion vector field by means of calculation according to a formula $\vec{MV} \times (t-t1)/(t1-t2)$, where $\vec{MV}$ is a motion vector of a first sampling point of the first reference motion vector field, and a location to which moving is performed from a location of the first sampling point as a start point according to the motion vector of the second sampling point as displacement is the same as a location of the second sampling point.

Optionally, obtaining a second reference motion vector field according to the first reference motion vector field, the moment t, the moment t1, and a moment t2 includes determining a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and (t−t1)/(t1−t2), and setting a product of a weighted average value of the motion vectors of the at least two first sampling points and (t−t1)/(t1−t2) as a motion vector of the second sampling point.

Optionally, obtaining a second reference motion vector field according to the first reference motion vector field, the moment t, the moment t1, and a moment t2 includes obtaining at least one second sampling point close to a target second sampling point of the second reference motion vector field, where a location to which moving is performed from a location of any first sampling point of the first reference motion vector field as a start point according to $\vec{MV} \times (t-t1)/(t1-t2)$ as displacement is different from a location of the target second sampling point, and $\vec{MV}$ is a motion vector of the first sampling point, and setting a weighted value of a motion vector of the second sampling point as a motion vector of the target second sampling point when the at least one second sampling point is one second sampling point, or setting a weighted average value of motion vectors of the at least two second sampling points as a motion vector of the target second sampling point when the at least one second sampling point is at least two second sampling points.

Optionally, obtaining a prediction signal of the current motion vector field block and prediction information of the current motion vector field block includes obtaining a direction coefficient of the current motion vector field block, where the direction coefficient is used to indicate a relationship between a value of a first component of a motion vector of a sampling point of the current motion vector field block and a value of a second component of the motion vector of the sampling point, obtaining a reconstruction value of the first component, calculating the prediction signal according to the reconstruction value of the first component and the direction coefficient, where the prediction signal includes a predictor of the second component, and obtaining the prediction information according to the direction coefficient, where the prediction information includes direction coefficient information used to indicate the direction coefficient.

Optionally, the obtaining a direction coefficient of the current motion vector field block includes obtaining motion vectors of at least two sampling points of the original signal, setting first components of the motion vectors of the at least two sampling points as independent variables of a preset function, setting second components of the motion vectors of the at least two sampling points as function values corresponding to the independent variables, and fitting the independent variables and the function values, and setting a coefficient of the preset function obtained by means of fitting as the direction coefficient.

Optionally, obtaining a direction coefficient of the current motion vector field block includes obtaining motion vectors of at least two sampling points of the original signal, setting first components of the motion vectors of the at least two sampling points as independent variables, setting second components of the motion vectors of the at least two sampling points as function values corresponding to the independent variables, fitting the independent variables and the function values, obtaining a direction coefficient of at least one coded motion vector field block that is in the current motion vector field and that is close to the current motion vector field block, setting a function coefficient obtained by means of fitting and the direction coefficient of the at least one coded motion vector field block as candidate direction coefficients of a candidate direction coefficient set of the current motion vector field block, obtaining candidate prediction residual signals of the current motion vector field block corresponding to the candidate direction coefficients of the candidate direction coefficient set, and setting a candidate direction coefficient corresponding to a candidate prediction residual signal with smallest signal energy or smallest rate distortion, as the direction coefficient of the current motion vector field block.

Optionally, obtaining a direction coefficient of the current motion vector field block includes setting the direction coefficients of the at least two coded motion vector field blocks as the direction coefficient of the current motion vector field block when direction coefficients of at least two coded motion vector field blocks that are in the current motion vector field and that are adjacent to the current motion vector field block are the same.

Optionally, obtaining a direction coefficient of the current motion vector field block includes, when direction coefficients of at least two coded motion vector field blocks that are in the current motion vector field and that are adjacent to the current motion vector field block are the same, and the direction coefficients of the at least two coded motion vector field blocks are used to indicate a ratio of a first component of a motion vector of a sampling point of the at least two coded motion vector field blocks to a second component of the motion vector of the sampling point, performing the following steps of setting the direction coefficients of the at least two coded motion vector field blocks as a candidate direction coefficient of a candidate direction coefficient set, obtaining a motion vector of at least one sampling point in the original signal, and setting a ratio of a first component of the motion vector of the sampling point to a second component of the motion vector of the sampling point as a candidate direction coefficient of the candidate direction coefficient set when the at least one sampling point is one sampling point, or setting an average value of ratios of first components of motion vectors of the at least two sampling points to second components of the motion vectors of the at least two sampling points as a candidate direction coefficient of the candidate direction coefficient set when the at least one sampling point is at least two sampling points, obtaining candidate prediction residual signals of the current motion vector field block corresponding to the candidate direction coefficients of the candidate direction coefficient set, and setting a candidate direction coefficient corresponding to a candidate prediction residual signal with smallest signal energy or smallest rate distortion, as the direction coefficient of the current motion vector field block.

Figure 13:
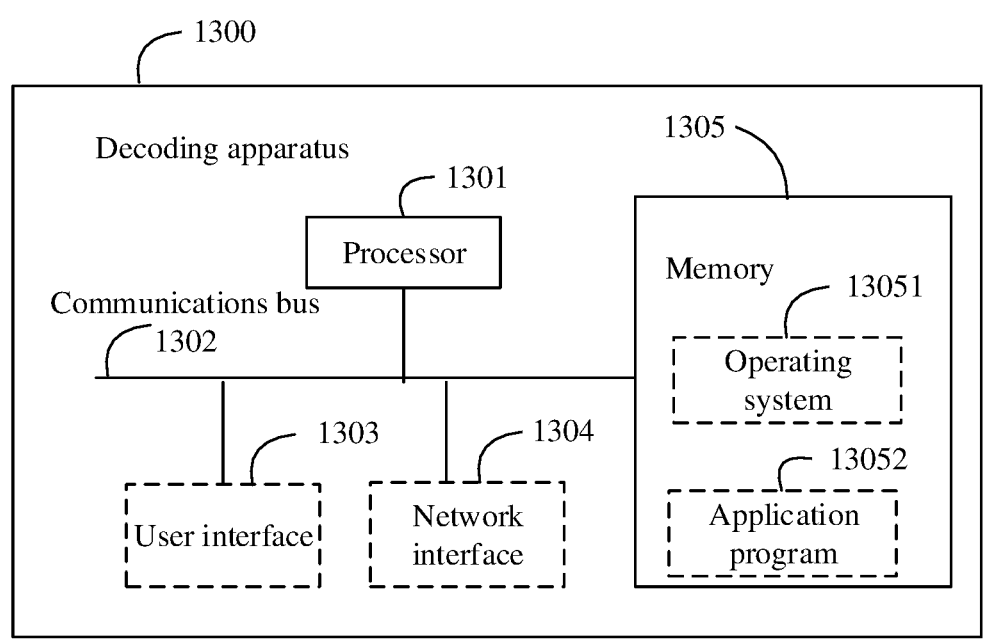
FIG. 13 is a structural block diagram of another embodiment of a decoding apparatus according to the present disclosure.

Referring to FIG. 13, FIG. 13 is a structural block diagram of a decoding apparatus 1300 provided in another embodiment of the present disclosure. The decoding apparatus 1300 may include at least one processor 1301, a memory 1305, and at least one communications bus 1302. Optionally, the decoding apparatus 1300 may further include at least one network interface 1304 and/or a user interface 1303. The user interface 1303 includes, for example, a display (for example, a touchscreen, an LCD, holographic imaging, a CRT, or a projector), a click device (for example, a mouse, a trackball, a touch panel, or a touchscreen), a camera, and/or a sound pickup apparatus.

The memory 1305 may include a ROM and a RAM, and provides an instruction and data for the processor 1301. A part of the memory 1305 may further include an NVRAM.

In some implementations, the memory 1305 stores the following elements, that is, an executable module or a data structure, a subset thereof, or an extension set thereof, an operating system 13051, including various system programs and configured to implement various basic services and process a hardware-based task, and an application program 13052, including various application programs and configured to implement various application services.

In this embodiment of the present disclosure, by invoking the program or instruction stored in the memory 1305, the processor 1301 is configured to obtain prediction information and a prediction residual signal of a current motion vector field block, where the current motion vector field block is obtained by dividing a current motion vector field into blocks, and the current motion vector field is a motion vector field corresponding to a video frame at a moment t, obtain a prediction signal of the current motion vector field block according to the prediction information, and calculate a reconstruction signal of the current motion vector field block according to the prediction signal and the prediction residual signal.

Optionally, the prediction information includes information used to indicate a first reference motion vector field of the motion vector field block.

The obtaining a prediction signal of the current motion vector field block according to the prediction information includes obtaining the first reference motion vector field according to the prediction information, where the first reference motion vector field is a motion vector field of a video frame at a moment t1, obtaining a second reference motion vector field according to the first reference motion vector field, the moment t, the moment t1, and a moment t2, where the moment t2 is a moment corresponding to a reference video frame used for the video frame corresponding to the first reference motion vector field, and obtaining a motion vector field block of the second reference motion vector field, where a coordinate range of the motion vector field block of the second reference motion vector field in the second reference motion vector field is the same as a coordinate range of the current motion vector field block in the current motion vector field, and the prediction signal includes the motion vector field block of the second reference motion vector field.

Optionally, obtaining a second reference motion vector field according to the first reference motion vector field, the moment t, the moment t1, and a moment t2 includes obtaining a motion vector of a second sampling point of the second reference motion vector field by means of calculation according to a formula $\overrightarrow{MV} \times (t-t1)/(t1-t2)$, where $\overrightarrow{MV}$ is a motion vector of a first sampling point of the first reference motion vector field, and a location to which moving is performed from a location of the first sampling point as a start point according to the motion vector of the second sampling point as displacement is the same as a location of the second sampling point.

Optionally, obtaining a second reference motion vector field according to the first reference motion vector field, the moment t, the moment t1, and a moment t2 includes determining a second sampling point of the second reference motion vector field, where a location of the second sampling point is the same as a location to which moving is performed from a location of each of at least two first sampling points of the first reference motion vector field as a start point according to a movement vector of each of the at least two first sampling points as displacement, and the movement vector of each of the at least two first sampling points is a product of a motion vector of each of the at least two first sampling points and $(t-t1)/(t1-t2)$, and setting a product of a weighted average value of the motion vectors of the at least two first sampling points and $(t-t1)/(t1-t2)$ as a motion vector of the second sampling point.

Optionally, obtaining a second reference motion vector field according to the first reference motion vector field, the moment t, the moment t1, and a moment t2 includes obtaining at least one second sampling point close to a target second sampling point of the second reference motion vector field, where a location to which moving is performed from a location of any first sampling point of the first reference motion vector field as a start point according to $\overrightarrow{MV} \times (t-t1)/(t1-t2)$ as displacement is different from a location of the target second sampling point, and $\overrightarrow{MV}$ is a motion vector of the first sampling point, and setting a weighted value of a motion vector of the second sampling point as a motion vector of the target second sampling point when the at least one second sampling point is one second sampling point, or setting a weighted average value of motion vectors of the at least two second sampling points as a motion vector of the target second sampling point when the at least one second sampling point is at least two second sampling points.

Optionally, the prediction information includes direction coefficient information used to indicate a direction coefficient of the current motion vector field block. The direction coefficient is used to indicate a relationship between a value of a first component of a motion vector of a sampling point of the current motion vector field block and a value of a second component of the motion vector of the sampling point.

Obtaining a prediction signal of the current motion vector field block according to the prediction information includes obtaining a reconstruction value of the first component, and calculating a predictor of the second component according to the direction coefficient and the reconstruction value of the first component, where the prediction signal includes the predictor of the second component.

Optionally, the direction coefficient information includes information used to indicate a reconstructed motion vector field block in the current motion vector field, and the direction coefficient includes a direction coefficient of the reconstructed motion vector field block. Alternatively, the direction coefficient information includes a value of the direction coefficient.

It can be clearly understood by persons skilled in the art that, for ease and brevity of description, for detailed working processes of the foregoing systems, apparatuses, and units, reference may be made to corresponding processes in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, multiple units or components may be combined or may be integrated into another system, or some features may be ignored or not performed. In addition, the displayed or discussed mutual couplings, direct couplings, or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on multiple network units. Some or all of the units may be selected according to an actual requirement, to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer readable storage medium. Based on such an understanding, the technical solutions of the present disclosure essentially, all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing embodiments are merely intended to describe the technical solutions of the present disclosure, but are not intended to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A motion vector field coding method, comprising:
    obtaining an original signal of a current motion vector field block obtained by dividing the current motion vector field block into a plurality of blocks, wherein the current motion vector field comprises a motion vector field corresponding to a video frame at a moment t, and wherein a value of each sampling point in the current motion vector field is a motion vector of an image block corresponding to a sampling point;
    obtaining a prediction signal of the current motion vector field block and prediction information of the current motion vector field block, wherein the prediction information comprises direction coefficient information indicating a direction coefficient of the current motion vector field block, wherein the direction coefficient indicates a function relationship between a first value of a first component of a first sampling point of the current motion vector field block and a second value of a second component of a second sampling point of the current motion vector field block, and wherein obtaining the prediction signal of the current motion vector field block and the prediction information of the current motion vector field block comprises:
        obtaining a reconstruction value of the first component; and
        calculating a predictor of the second component according to the direction coefficient and the reconstruction value of the first component, wherein the prediction signal comprises the predictor of the second component;
    calculating a prediction residual signal of the current motion vector field block according to the prediction signal and the original signal, wherein the prediction residual signal indicates a residual between the original signal and the prediction signal; and
    writing the prediction information indicating the prediction mode used to obtain the prediction signal of the current motion vector field block and the prediction residual signal into a bitstream, wherein the original signal of the current motion vector field block is not written into the bitstream.

2. The motion vector field coding method of claim 1, wherein obtaining the prediction signal of the current motion vector field block and the prediction information of the current motion vector field block further comprises:
    obtaining the first reference motion vector field of the current motion vector field block, wherein the first reference motion vector field comprises the coded and reconstructed motion vector field corresponding to a video frame at a moment t1, and wherein the video frame at the moment t1 comprises a video frame close to the video frame at the moment t;
    obtaining a second reference motion vector field according to the first reference motion vector field, the moment t, the moment t1, and a moment t2, wherein the moment t2 comprises a moment corresponding to a reference video frame used for performing inter-frame prediction on the video frame corresponding to the first reference motion vector field;
    obtaining the prediction signal according to the second reference motion vector field, wherein the prediction signal comprises a motion vector field block of the second reference motion vector field, and wherein a coordinate range of the motion vector field block of the second reference motion vector field in the second reference motion vector field is the same as a coordinate range of the current motion vector field block in the current motion vector field; and obtaining the prediction information according to the first reference motion vector field, wherein the prediction information comprises information indicating the first reference motion vector field.

3. The motion vector field coding method of claim 2, wherein obtaining the second reference motion vector field comprises obtaining a motion vector of a second sampling point of the second reference motion vector field by calculation according to a formula $\overline{MV} \times (t-t1)/(t1-t2)$, wherein $\overline{MV}$ comprises a motion vector of a first sampling point of the first reference motion vector field, and wherein a location to which moving is performed from a location of the first sampling point as a start point according to the motion vector of the second sampling point as displacement is the same as a location of the second sampling point.

4. A motion vector field decoding method, comprising:
obtaining a prediction information and a prediction residual signal of a current motion vector field block from a bitstream, wherein an original signal of the current motion vector field block is not included in the bitstream, wherein the current motion vector field block is obtained by dividing the current motion vector field block into a plurality of blocks, wherein the current motion vector field comprises a motion vector field corresponding to a video frame at a moment t, and wherein a value of each sampling point in the current motion vector field is a motion vector of an image block corresponding to a sampling point;

obtaining a prediction signal of the current motion vector field block according to the prediction information, wherein the prediction information comprises direction coefficient information indicating a direction coefficient of the current motion vector field block, wherein the direction coefficient indicates a relationship between a first value of a first component of a motion vector of a sampling point of the current motion vector field block and a second value of a second component of a second sampling point of the current motion vector field block, and wherein obtaining the prediction signal comprises:
obtaining a reconstruction value of the first component; and
calculating a predictor of the second component according to the direction coefficient and the reconstruction value of the first component, wherein the prediction signal comprises the predictor of the second component; and calculating a reconstruction signal of the current motion vector field block according to the prediction signal and the prediction residual signal.

5. The motion vector field decoding method of claim 4, wherein the prediction information further comprises information indicating the first reference motion vector field of the current motion vector field block, and wherein obtaining the prediction signal of the current motion vector field block further comprises:
obtaining the first reference motion vector field according to the prediction information, wherein the first reference motion vector field comprises a motion vector field of a video frame at a moment t1;
obtaining a second reference motion vector field according to the first reference motion vector field, the moment t, the moment t1, and a moment t2, wherein the moment t2 comprises a moment corresponding to a reference video frame used for the video frame corresponding to the first reference motion vector field; and obtaining a motion vector field block of the second reference motion vector field, wherein a coordinate range of the motion vector field block of the second reference motion vector field in the second reference motion vector field is the same as a coordinate range of the current motion vector field block in the current motion vector field, and wherein the prediction signal comprises the motion vector field block of the second reference motion vector field.

6. The motion vector field decoding method of claim 5, wherein obtaining the second reference motion vector field comprises obtaining a motion vector of a second sampling point of the second reference motion vector field by calculation according to a formula $\overline{MV} \times (t-t1)/(t1-t2)$ wherein $\overline{MV}$ comprises a motion vector of a first sampling point of the first reference motion vector field, and wherein a location to which moving is performed from a location of the first sampling point as a start point according to the motion vector of the second sampling point as displacement is the same as a location of the second sampling point.

7. The motion vector field decoding method of claim 5, wherein obtaining the second reference motion vector field comprises:
setting a product of a weighted average value of motion vectors of at least two first sampling points and $(t-t1)/(t1-t2)$ as a motion vector of a second sampling point of the second reference motion vector field, wherein a location of the second sampling point is the same as a location to which moving is performed from a location of each of at least two first sampling points of the first reference motion vector field as a start point according to a movement vector of each of the at least two first sampling points as displacement, and wherein the movement vector of each of the at least two first sampling points comprises a product of a motion vector of each of the at least two first sampling points and $(t-t1)/(t1-t2)$.

8. The motion vector field decoding method of claim 5, wherein obtaining the second reference motion vector field comprises:
obtaining at least one second sampling point close to a target second sampling point of the second reference motion vector field, wherein a location to which moving is performed from a location of any first sampling point of the first reference motion vector field as a start point according to $\overrightarrow{MV} \times (t-t1)/(t1-t2)$ as displacement is different from a location of the target second sampling point, and wherein $\overline{MV}$ comprises a motion vector of the first sampling point;
setting a weighted value of a motion vector of the second sampling point as a motion vector of the target second sampling point when the at least one second sampling point comprises one second sampling point; and
setting a weighted average value of motion vectors of at least two second sampling points as the motion vector of the target second sampling point when at least one second sampling point comprises the at least two second sampling points.

9. The motion vector field decoding method of claim 4, wherein the direction coefficient information comprises:
information indicating a reconstructed motion vector field block in the current motion vector field, wherein the direction coefficient comprises a direction coefficient of the reconstructed motion vector field block; or
a value of the direction coefficient.

10. A coding apparatus, comprising:
a memory comprising instructions; and
a processor coupled to the memory, wherein the instructions cause the processor to be configured to:
obtain an original signal of a current motion vector field block, wherein the current motion vector field block is obtained by dividing the current motion vector field block into a plurality of blocks, wherein the current motion vector field comprises a motion vector field corresponding to a video frame at a moment t, and wherein a value of each sampling point in the current motion vector field is a motion vector of an image block corresponding to a sampling point;
obtain a prediction signal of the current motion vector field block and prediction information of the current motion vector field block, wherein the prediction information comprises direction coefficient information indicating a direction coefficient of the current motion vector field block, wherein the direction coefficient indicates a relationship between a first value of a first component of a first sampling point of the current motion vector field block and a second value of a second component of a second sampling point of the current motion vector field block, and wherein in a manner to obtain the prediction signal of the current motion vector field block and the prediction information of the current motion vector field block, the instructions further cause the processor to be configured to:
obtain a reconstruction value of the first component; and
calculate a predictor of the second component according to the direction coefficient and the reconstruction value of the first component, wherein the prediction signal comprises the predictor of the second component;
calculate a prediction residual signal of the current motion vector field block according to the prediction signal and the original signal, wherein the prediction residual signal indicates a residual between the original signal and the prediction signal; and
write the prediction information indicating the prediction mode used to obtain the prediction signal of the current motion vector field block and the prediction residual signal into a bitstream, wherein the original signal of the current motion vector field block is not written into the bitstream.

11. The coding apparatus of claim 10, wherein the instructions further cause the processor to be configured to:
obtain the first reference motion vector field of the current motion vector field block, wherein the first reference motion vector field comprises the coded and reconstructed motion vector field corresponding to a video frame at a moment t1, and wherein the video frame at the moment t1 comprises a video frame close to the video frame at the moment t;
obtain a second reference motion vector field according to the first reference motion vector field, the moment t, the moment t1, and a moment t2, wherein the moment t2 comprises a moment corresponding to a reference video frame used for performing inter-frame prediction on the video frame corresponding to the first reference motion vector field;
obtain the prediction signal according to the second reference motion vector field, wherein the prediction signal comprises a motion vector field block of the second reference motion vector field, and wherein a coordinate range of the motion vector field block of the second reference motion vector field in the second reference motion vector field is the same as a coordinate range of the current motion vector field block in the current motion vector field; and
obtain the prediction information according to the first reference motion vector field, wherein the prediction information comprises information indicating the first reference motion vector field.

12. The coding apparatus of claim 11, wherein the instructions further cause the processor to be configured to obtain a motion vector of a second sampling point of the second reference motion vector field by calculation according to a formula $\overrightarrow{MV} \times (t-t1)/(t1-t2)$, wherein $\overrightarrow{MV}$ comprises a motion vector of a first sampling point of the first reference motion vector field, and wherein a location to which moving is performed from a location of the first sampling point as a start point according to the motion vector of the second sampling point as displacement is the same as a location of the second sampling point.

13. A decoding apparatus, comprising:
a memory comprising instructions; and
a processor coupled to the memory, wherein the instructions cause the processor to be configured to:
obtain prediction information and a prediction residual signal of a current motion vector field block from a bitstream, wherein an original signal of the current motion vector field block is not included in the bitstream, wherein the current motion vector field block is obtained by dividing the current motion vector field block into a plurality of blocks, wherein the current motion vector field comprises a motion vector field corresponding to a video frame at a moment t, and wherein a value of each sampling point in the current motion vector field is a motion vector of an image block corresponding to a sampling point;
obtain a prediction signal of the current motion vector field block according to the prediction information, wherein the prediction information comprises direction coefficient information indicating a direction coefficient of the current motion vector field block, wherein the direction coefficient indicates a relationship between a first value of a first component of a first sampling point of the current motion vector field block and a second value of a second component of a second sampling point of the current motion vector field block, and wherein in a manner to obtain the prediction signal of the current motion vector field block, the instructions further cause the processor to be configured to:
obtain a reconstruction value of the first component; and
calculate a predictor of the second component according to the direction coefficient and the reconstruction value of the first component, wherein the prediction signal comprises the predictor of the second component; and
calculate a reconstruction signal of the current motion vector field block according to the prediction signal and the prediction residual signal.

14. The decoding apparatus of claim 13, wherein the prediction information comprises information indicating the first reference motion vector field of the current motion vector field block, and wherein the instructions further cause the processor to be configured to:
   obtain the first reference motion vector field according to the prediction information, wherein the first reference motion vector field comprises a motion vector field of a video frame at a moment t1;
   obtain a second reference motion vector field according to the first reference motion vector field, the moment t, the moment t1, and a moment t2, wherein the moment t2 comprises a moment corresponding to a reference video frame used for the video frame corresponding to the first reference motion vector field; and
   obtain a motion vector field block of the second reference motion vector field, wherein a coordinate range of the motion vector field block of the second reference motion vector field in the second reference motion vector field is the same as a coordinate range of the current motion vector field block in the current motion vector field, and wherein the prediction signal comprises the motion vector field block of the second reference motion vector field.

15. The decoding apparatus of claim 14, wherein the instructions further cause the processor to be configured to obtain a motion vector of a second sampling point of the second reference motion vector field by calculation according to a formula $\overrightarrow{MV} \times (t-t1)/(t1-t2)$, wherein $\overrightarrow{MV}$ comprises a motion vector of a first sampling point of the first reference motion vector field, and wherein a location to which moving is performed from a location of the first sampling point as a start point according to the motion vector of the second sampling point as displacement is the same as a location of the second sampling point.

16. The decoding apparatus of claim 14, wherein the instructions further cause the processor to be configured to:
   set a product of a weighted average value of motion vectors of at least two first sampling points and $(t-t1)/(t1-t2)$ as a motion vector of a second sampling point of the second reference motion vector field, wherein a location of the second sampling point is the same as a location to which moving is performed from a location of each of at least two first sampling points of the first reference motion vector field as a start point according to a movement vector of each of the at least two first sampling points as displacement, and wherein the movement vector of each of the at least two first sampling points comprises a product of a motion vector of each of the at least two first sampling points and $(t-t1)/(t1-t2)$.

17. The decoding apparatus of claim 14, wherein the instructions further cause the processor to be configured to:
   obtain at least one second sampling point close to a target second sampling point of the second reference motion vector field, wherein a location to which moving is performed from a location of any first sampling point of the first reference motion vector field as a start point according to $\overrightarrow{MV} \times (t-t1)/(t1-t2)$ as displacement is different from a location of the target second sampling point, and wherein $\overrightarrow{MV}$ comprises a motion vector of the first sampling point;
   set a weighted value of a motion vector of the second sampling point as a motion vector of the target second sampling point when the at least one second sampling point comprises one second sampling point; and
   set a weighted average value of motion vectors of at least two second sampling points as the motion vector of the target second sampling point when the at least one second sampling point comprises the at least two second sampling points.

18. The decoding apparatus of claim 13, wherein the direction coefficient information comprises:
   information indicating a reconstructed motion vector field block in the current motion vector field, wherein the direction coefficient comprises a direction coefficient of the reconstructed motion vector field block; or
   a value of the direction coefficient.

19. The decoding apparatus of claim 13, wherein the function relationship between the first component and second component of all sampling points in the current motion vector field block is the same.

20. The motion vector field coding method of claim 1, wherein the function relationship between the first component and second component of all sampling points in the current motion vector field block is the same.

* * * * *

UNITED STATES PATENT AND TRADEMARK OFFICE
CERTIFICATE OF CORRECTION

Page 1 of 1

PATENT NO. : 11,102,501 B2
APPLICATION NO. : 15/901410
DATED : August 24, 2021
INVENTOR(S) : Hong Zhang and Haitao Yang It is certified that error appears in the above-identified patent and that said Letters Patent is hereby corrected as shown below:

In the Claims

Claim 3, Column 45, Lines 14 and 15: "formula $\overline{MV}$ × (t-t1)/(t1-t2), wherein $\overline{MV}$ comprises" should read "formula $\overrightarrow{MV}$ × (t – t1) /(t1 – t2), wherein $\overrightarrow{MV}$ comprises"

Claim 6, Column 46, Lines 18 and 19: "formula $\overline{MV}$ × (t-t1)/(t1-t2) wherein $\overline{MV}$ comprises" should read "formula $\overrightarrow{MV}$ × (t – t1) /(t1 – t2), wherein $\overrightarrow{MV}$ comprises"

Claim 8, Column 46, Line 53: "wherein $\overline{MV}$ comprises" should read "wherein $\overrightarrow{MV}$ comprises"

Claim 12, Column 48, Line 19: "wherein $\overline{MV}$ comprises" should read "wherein $\overrightarrow{MV}$ comprises"

Claim 15, Column 49, Line 29: "wherein $\overline{MV}$ comprises" should read "wherein $\overrightarrow{MV}$ comprises"

Claim 17, Column 50, Line 18: "wherein $\overline{MV}$ comprises" should read "wherein $\overrightarrow{MV}$ comprises"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*